United States Patent [19]

Asayama et al.

[11] Patent Number: 4,836,057
[45] Date of Patent: Jun. 6, 1989

[54] METHOD OF CONTROLLING SPEED CHANGE CLUTCHES IN A TRANSMISSION

[75] Inventors: Yoshio Asayama, Chigasaki; Makio Tsubota, Hiratsuka; Yukitaka Takitani, Isehara; Yasunori Okura, Hiratsuka, all of Japan

[73] Assignee: Kabushiki Kaisha Komatsu Seisakusho, Japan

[21] Appl. No.: 923,168
[22] PCT Filed: Feb. 19, 1986
[86] PCT No.: PCT/JP86/00076
§ 371 Date: Dec. 16, 1986
§ 102(e) Date: Dec. 16, 1986
[87] PCT Pub. No.: WO86/04969
PCT Pub. Date: Aug. 28, 1986

[30] Foreign Application Priority Data
Feb. 19, 1985 [JP] Japan .................... 60-31097
Dec. 2, 1985 [JP] Japan ................... 60-271055

[51] Int. Cl.⁴ .................................. B60K 41/06
[52] U.S. Cl. .................................... 74/867
[58] Field of Search ............. 74/866, 867, 865; 364/424.1; 192/109 F, 87.12, 87.14

[56] References Cited

U.S. PATENT DOCUMENTS

| 3,757,606 | 9/1973 | Forster et al. | 74/867 X |
|---|---|---|---|
| 4,036,083 | 7/1977 | McQuinn | 74/867 |
| 4,208,925 | 6/1980 | Miller et al. | 74/866 |
| 4,226,142 | 10/1980 | Rembold et al. | 74/867 |
| 4,262,557 | 4/1981 | Grob et al. | 74/861 |
| 4,314,340 | 2/1982 | Miki et al. | 364/424.1 |
| 4,338,666 | 7/1982 | Suzuki et al. | 364/424.1 |
| 4,338,832 | 7/1982 | Pelligrino | 74/867 X |
| 4,354,236 | 10/1982 | Miki et al. | 364/424.1 |
| 4,380,048 | 4/1983 | Kishi et al. | 74/866 X |
| 4,523,281 | 6/1985 | Noda et al. | 364/424.1 |
| 4,548,079 | 10/1985 | Klatt | 364/424.1 X |
| 4,584,906 | 4/1986 | Nagaoka et al. | 74/866 |
| 4,630,508 | 12/1986 | Klatt | 74/866 |
| 4,633,985 | 1/1987 | Leorat | 74/867 X |
| 4,653,350 | 3/1987 | Downs et al. | 74/866 X |

FOREIGN PATENT DOCUMENTS 57-101154 6/1982 Japan.

OTHER PUBLICATIONS

"Electronic/Hydraulic Transmission Control System for Off-Highway Hauling Vehicles", by Morris and Sorrells, pp. 1–7, S.A.E. 850783, publ. 1985.

Primary Examiner—Leslie A. Braun
Assistant Examiner—Dwight G. Diehl
Attorney, Agent, or Firm—Welsh & Katz

[57] ABSTRACT

A plurality of clutch hydraulic pressure gradual increase patterns for maintaining jerk value at a level of a target value are previously determined in dependence on vehicle weight and speed stages; a clutch hydraulic pressure gradual increase pattern corresponding to the vehicle weight and speed stage selected at the time of speed change is selected from the aforesaid plurality of clutch hydraulic pressure gradual increases patterns. Then, hydraulic pressure in a speed change clutch to be engaged is caused to increase gradually in accordance with the thus selected clutch hydraulic pressure gradual increase pattern.

At the time point when a speed change command is issued, a speed change clutch to be subsequently brought in the engaged state is fed with hydraulic oil and gradually increasing hydraulic pressure is exerted on the speed change clutch after the time point when termination of filling time is confirmed with respect to this speed change clutch. Further, at this time point hydraulic pressure in the speed change clutch which is now brought in the engaged state decreased.

8 Claims, 21 Drawing Sheets

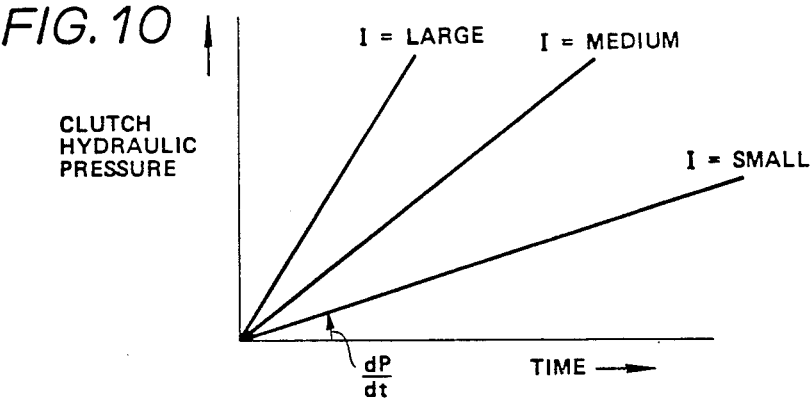
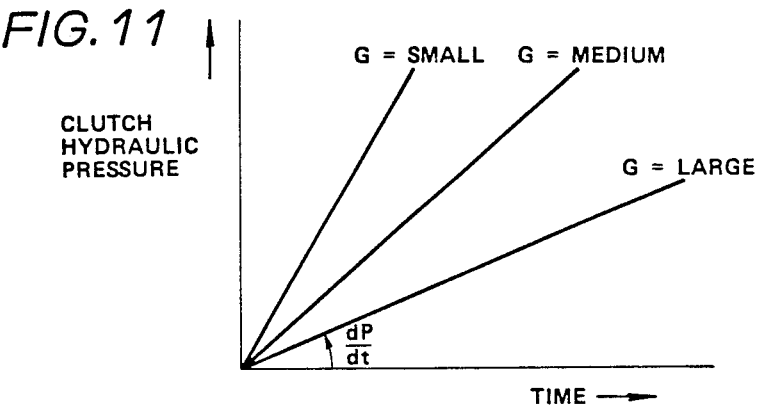
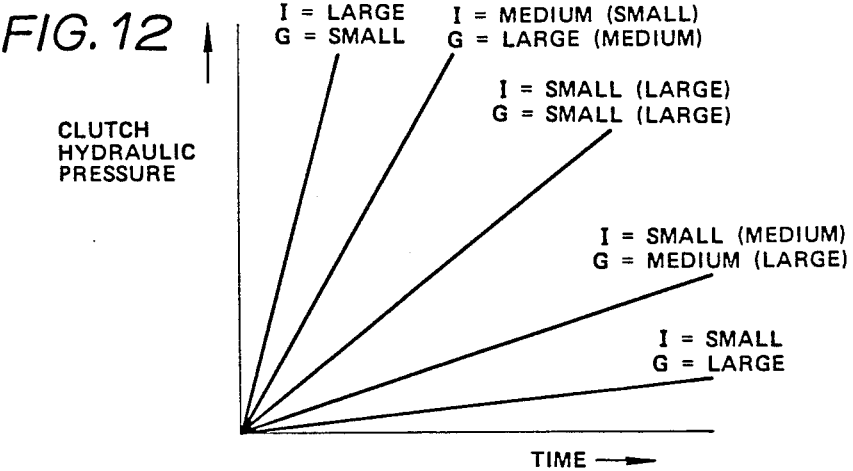

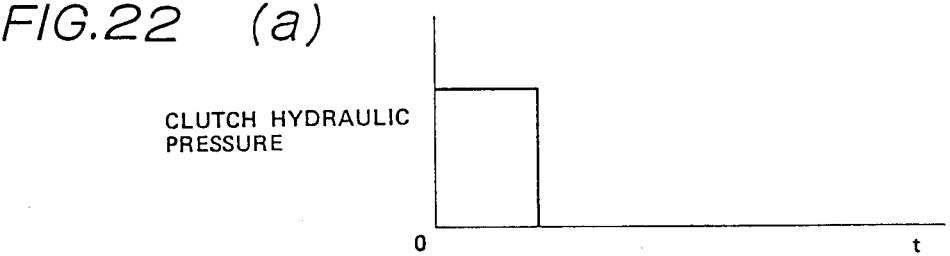
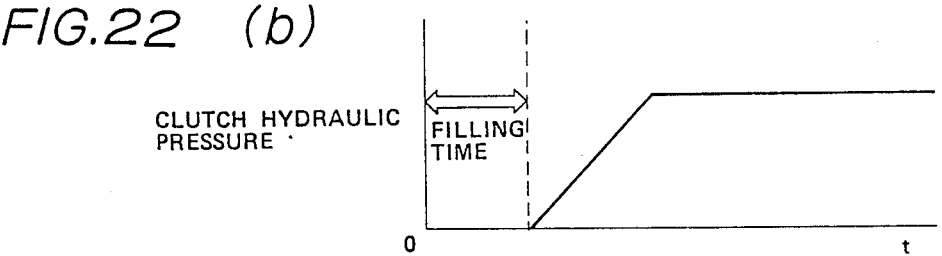
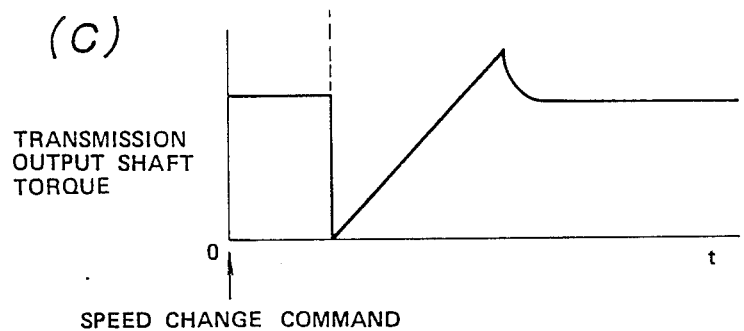

METHOD OF CONTROLLING SPEED CHANGE CLUTCHES IN A TRANSMISSION

TECHNICAL FIELD

The present invention relates to a method of controlling a plurality of speed change clutches which are incorporated in a gear type transmission.

BACKGROUND OF THE INVENTION

A gear type transmission having a plurality of speed change clutches incorporated therein is so constructed that change of speed stages is carried out by making selective engagement among the speed change clutches and therefore so-called speed change shock occurs during engagement among the speed change clutches. As is well known for any expert in the art, the larger an amount of slippage of the speed change clutches, the smaller the speed change shock. On the other hand, increase of an amount of slippage leads to increase of an amount of heat generated by the speed change clutches. Due to the fact that construction machine such as dump truck or the like has considerably high intensity of torque transmitted by the speed change clutches compared with that of passenger car or the like, a large amount of heat is generated by slippage.

In view of the above-mentioned fact construction machine is so designed that clutch hydraulic pressure is caused to increase gradually (in the form of modulation) to such an extent that an amount of slippage does not increase excessively.

Torque transmitted by means of the speed change clutches varies considerably in dependence on the running state of a vehicle. Specifically, torque to be transmitted in the case where an article having heavy weight is loaded on the vehicle is remarkably different from that in the case where no article is loaded thereon.

Since clutch hydraulic pressure is hitherto caused to increase gradually with the use of mechanical type modulation valves, it results that clutch hydraulic pressure has fixed gradual increase characteristics and thereby this leads to an occurrence of such malfunctions that a high intensity of speed change shock appears under a certain running state of vehicle and an amount of slippage increases unnecessarily.

One of objects of the present invention is to inhibit an occurrence of malfunctions as mentioned above.

On the other hand, a conventional transmission in which clutch hydraulic pressure is caused to increase gradually with the use of mechanical type modulation valves has the following drawbacks.

Specifically, FIG. 27 schematically illustrates an example of a gear type transmission employed for dump truck or the like. As is apparent from the drawing, the transmission is equipped with speed change clutches 401, 402, 403 and 404 for selecting one of speed stages comprising first speed, second speed, third speed and rearward movement.

It has been found with respect to the conventional transmission as constructed in the above-described manner that so-called speed change shock occurs when hydraulic pressure is abruptly exerted on the speed change clutches 401 to 404. To obviate this problem the transmission is so constructed that a mechanical type modulation valve 410 and a quick return valve 411 are interposed between switching valves 405 to 408 hydraulically connected to the speed change clutches 401 to 404 and a hydraulic pump 409.

The modulation valve 410 and the quick return valve 411 have a function for gradually increasing hydraulic pressure, for instance, in the clutch 410 in the purely mechanical manner (in the form of modulation) when a switching valve 405 is shifted by activating an electromagnetically actuated valve 412 for the purpose of controlling of pilot pressure which is operatively connected to the switching valve 405. By virtue of the function as mentioned above hydraulic pressure exerted on the clutch 401 is caused to increase with a constant gradient (time change rate), resulting in speed change shock being reduced. When any one of the electromagnetically actuated valves 413, 414 and 415 is activated, clutch hydraulic pressure in the speed change clutch operatively associated with the thus selected electromagnetically actuated valve is caused to increase gradually.

Now, consideration is taken into account, for instance, on the case where speed change is carried out from first speed to second speed. In this case the electromagnetically actuated valve 413 is activated at the same time when the electromagnetically actuated valve 412 is deactivated. As a result, hydraulic pressure exerted on the speed change clutch 401 decreases from a predetermined pressure to a level of zero, as shown in FIG. 28(a). On the other hand, hydraulic pressure exerted on the clutch 402 is caused to increase gradually under the effect of the modulation valve 410 and the quick return valve 411 after filling time to be described later elapses, as shown in FIG. 28(b). At this moment output torque from the transmission varies as typically shown in FIG. 28(c).

The filling time by which clutch hydraulic pressure is maintained at the substantially zero state is generated when hydraulic oil flows rapidly into the clutch pack of the speed change clutch 402 which is kept in the empty state and this filling time is over at the time point when the clutch pack is fully filled with hydraulic oil.

It is natural that during the period of filling time torque transmitted from the transmission is reduced to a level of zero. For the reason it is preferable that this filling time is short as far as possible and it is ideal that it is not existent. Thus, such a technical idea that a large amount of hydraulic oil is fed into a speed change clutch to shorten filling time is thinkable. However, to realize the above-mentioned technical idea there is a problem that a hydraulic pressure mechanism is constructed in larger dimensions. It is impossible to completely eliminate filling time in spite of the fact that the hydraulic pressure mechanism is designed and constructed in larger dimensions.

Another object of the present invention is to obviate the problem which is caused by filling time by which transmitted torque is reduced to a level of zero without any necessity for designing the hydraulic pressure mechanism in larger dimensions.

Another object of the present invention is to inhibit an occurrence of speed change shock by equalizing output torque from the transmission just before speed change to output torque from the same immediately after speed change.

DISCLOSURE OF THE INVENTION

Speed change shock generated in the transmission having a plurality of speed change clutches incorporated therein can be evaluated with reference to jerk value (time change rate relative to acceleration of vehicle body). In order to reduce speed change shock the jerk value is required to be maintained at an adequate level of target value at all time.

According to the first aspect of the present invention a plurality of clutch hydraulic pressure increase patterns for maintaining jerk value at a level of target value on the assumption that disc friction coefficient of the speed change clutches does not change relative to time are previously determined corresponding to vehicle weight and speed stages. A clutch hydraulic pressure gradual increase pattern corresponding to vehicle weight and speed stage at the time of speed change is selected from the plurality of clutch hydraulic pressure gradual increase patterns whereby clutch hydraulic pressure is caused to increase gradually in accordance with the thus selected clutch hydraulic pressure gradual increase pattern.

According to the second aspect of the present invention a relation among clutch hydraulic pressure for maintaining the jerk value at a level of target value under the operative condition that the disc friction coefficient changes relative to time, disc relative revolution number and an amount of throttling is previously established. When the above-noted three factors reaches the relation where the target value can be maintained while clutch hydraulic pressure is caused to increase gradually in accordance with the selected hydraulic pressure gradual increase pattern, clutch hydraulic pressure is maintained at a level of value as measured at the aforesaid time point and thereafter clutch hydraulic pressure is caused to increase again at the time point when disc relative revolution number is decreased to a level of zero.

Further, according to the third aspect of the present invention a pressure control valve adapted to be actuated in response to an electrical command is operatively connected individually to each of the speed change clutches in order to resolve the problem which is attributable to the existence of filling time. At the time point when a speed change command is issued, a pressure control valve relative to a speed change clutch to be subsequently brought in the engaged state is operated and at the time point when termination of filling time is confirmed with respect to the speed change clutch, the pressure control valve relative to the speed change clutch is so controlled that hydraulic pressure exerted on the speed change clutch increases gradually. Moreover, the pressure control valve relative to the speed change clutch which is brought in the engaged state at the aforesaid time point is turned off.

Further, according to the fourth aspect of the present invention a pressure control valve relative to a speed change clutch which is subsequently brought in the engaged state is operated at the time point when a speed change command is issued and clutch hydraulic pressure relative to the speed change clutch is so controlled that output torque from the transmission at the time of speed change is equalized to output torque from the same at the first-mentioned time point. At the time point when filling time relative to speed change clutch is over, thus calculated clutch hydraulic pressure is applied to the speed change clutch and thereafter the pressure control valve relative to the speed change clutch is so controlled that clutch hydraulic pressure is caused to increase gradually and moreover at the time point when this filling time is over, the pressure control valve relative to the speed change clutch which is now brought in the engaged state is turned off.

Further, according to the fifth aspect of the present invention a pressure control valve relative to a speed change clutch to be subsequently brought in the engaged state is operated at the time point when a speed change command is issued and then clutch hydraulic pressure relative to each of the speed change clutch adapted to equalize output from the transmission at the time of speed change to output torque from the same at the first-mentioned time point and the speed change clutch which is now brought in the engaged state is calculated. Further, the pressure control valve relative to the speed change clutch which is now brought in the engaged state is so controlled that hydraulic pressure relative to the latter reaches an intensity of clutch hydraulic pressure as calculated with respect to this speed change clutch and then clutch hydraulic pressure as calculated with respect to the speed change clutch to be subsequently brought in the engaged state is exerted on the aforesaid speed change clutch at the time point when filling time is over with respect to this speed change clutch. Thereafter, pressure control valve relative to the speed change clutch is so controlled that clutch hydraulic pressure as mentioned above is caused to increase gradually and moreover the pressure control valve relative to the speed change clutch which is now brought in the engaged state is turned off at the time point when filling time is over.

According to the first and second aspects of the present invention it is assured that jerk value is maintained at a level of target value whereby speed change shock is reduced effectively.

According to the third aspect of the present invention it is assured that a speed change clutch is brought in the engaged state in such a manner that filling time is not substantially existent whereby there does not occur such a malfunction that torque transmitted from the transmission is reduced to a level of zero due to the existence of filling time.

Further, according to the fourth and fifth aspects of the present invention it is assured that no difference exists between output torque from the transmission just before speed change and output torque from the transmission immediately after speed change and thereby speed change shock can be reduced more effectively together with advantageous effects obtained according to the third aspect of the present invention.

It should be added that a typical electronically controlled type automatic speed changing apparatus is disclosed, for instance, in U.S. Pat. No. 4,208,925. Further, the fact that hydraulic pressure in a speed change clutch is controlled for the purpose of inhibiting an occurrence of speed change shock is shown, for instance, in a transaction titled "electrical/hydraulical transmission control system for off-highway trailing vehicle" (written by Hugh C. Morris and Giles K. Sorrelis, 1985, Society of Automotive Engineers) and official gazette of Japanese Laid-Open Patent No. 101154/1982.

BRIEF DESCRIPTION OF THE DRAWINGS

FIG. 10 is a graph exemplifying a plurality of clutch hydraulic pressure gradual increase pattern which fit a magnitude of vehicle weight.

FIG. 11 is a graph exemplifying a plurality of clutch hydraulic pressure gradual increase patterns which fit a magnitude of speed reduction ratio constant.

FIG. 12 is a graph exemplifying a plurality of clutch hydraulic pressure gradual increase patterns corresponding to magnitudes of vehicle weight and speed reduction ratio constant.

FIGS. 22a and 22b are graphs illustrating with reference to the flow chart in FIG. 15 how hydraulic pressure of a speed change clutch varies and how output torque from the transmission varies.

FIGS. 26a and 22b are graphs illustrating with reference to the flow chart in FIG. 25 how hydraulic pressure of a speed change clutch varies.

THE BEST MODE FOR CARRYING OUT THE INVENTION

Speed change shock appearing in a gear type transmission which is provided with a plurality of speed change clutches is evaluated by using a jerk value in accordance with the following formula.

$$J = \frac{d\alpha}{dt} = K\frac{G}{I} \cdot \left( \mu \frac{dP}{dt} + P \frac{d\mu}{dt} \right) \quad (1)$$

where
- $\alpha$: acceleration of body of vehicle
- $K$: conversion coefficient
- $G$: speed reduction ratio constant
- $I$: weight of vehicle (weight of body of vehicle + weight of article loaded on vehicle)
- $\mu$: friction coefficient of clutch disc
- $P$: hydraulic pressure exerted on clutch The above-noted speed reduction ratio constant G is determined in dependence on the number of speed stages and includes also coefficients which suggest the number of clutch plates arranged in the layered structure as well as area of the clutch plates in each of the speed stages. Accordingly, a value of constant G varies appreciably in dependence on each of the speed stages. It should of course be understood that the constant G represents speed reduction ratio, provided that the number of clutch plates arranged in the layered structure and their area are same for each of the speed stages.

Figure 9:
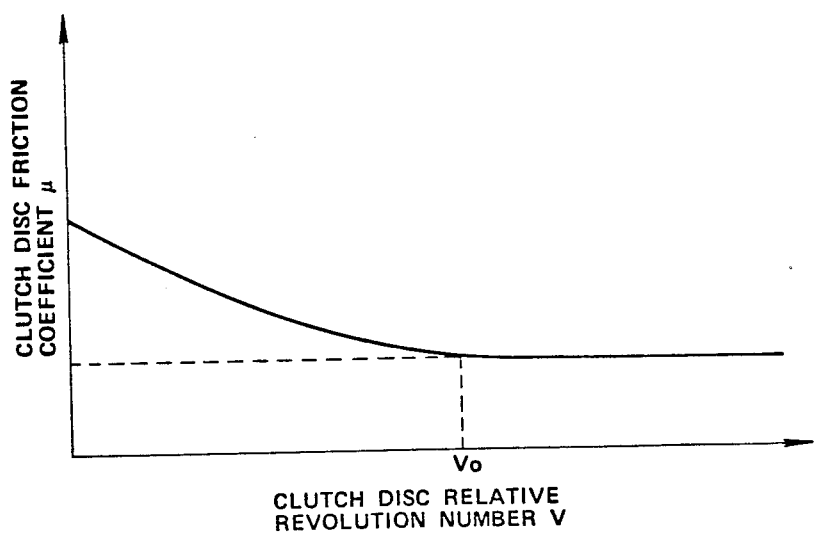
FIG. 9 is a graph exemplifying a relation between clutch disc relative revolution number and clutch disc friction coefficient.

As is apparent from Formula (1), variables by which the jerk value J is affected are G, I, P and $\mu$. Among them the variables P and $\mu$ become a variable during a transition period of speed change. FIG. 9 typically illustrates variation characteristic of $\mu$ in a wet type speed change clutch which is used for a power transmission incorporated in construction machine such as dump truck or the like vehicle. A point to be taken into account with reference to the drawing consists in that a formula is $$\frac{d\mu}{dt} \approx 0$$

is established when clutch disc relative revolution number V is larger than a certain value of $v_o$. This means that the formula $$\frac{d\mu}{dv} \approx 0$$

is established under the condition of $v > v_o$. This is because of the fact that time change of friction coefficient $\mu$ is represented by a formula $$\frac{d\mu}{dt} = \frac{d\mu}{dv} \cdot \frac{dv}{dt}.$$

When attention is paid to the characteristics of $\mu$ as mentioned above, a jerk value J can be represented by the following formula (2) for the time range as measured from the time when speed change clutches start engagement with one another to the time when the above-mentioned clutch disc relative revolution number reaches a value of $v_o$.

$$J = \frac{d\alpha}{dt} = \frac{KG\mu_0}{I} \cdot \frac{dP}{dt} \quad (2)$$

where $\mu_o$ represents clutch disc friction coefficient when the clutch disc relative revolution number reaches a value in excess of $v_o$.

Referring to Formula (2), only P functions as a variable during the period of time of speed change transition. Accordingly, in order to assure that the jerk value as represented by Formula (2) is maintained at a level of target value, it is a necessary that a value of $(dP)/(dt)$ is set corresponding to change of I in dependence of size of vehicle and change of G in accordance with selection of speed stage and thereafter hydraulic pressure exerted on the clutch is caused to increase gradually.

FIG. 10 typically illustrates patterns of gradual increase of hydraulic pressure exerted on the clutch for three cases, that is, one of them being such that vehicle weight G is large, other one being such that it is medium and another one being such that it is small. FIG. 11 typically illustrates patterns of gradual increase of hydraulic pressure exerted on the clutch for three cases, that is, one of them being such that speed reduction ratio constant G is large, other one being such that it is medium and another one being such that it is small. FIG. 12 typically illustrates patterns of gradual increase of hydraulic pressure exerted on the clutch for five cases of combination of I and G under such a condition that the latter are large, medium and small.

Next, description will be described below as to the case where clutch disc relative revolution number v assumes a value less than $v_o$ due to increased engagement of the clutch. In this case an inequality of $$\frac{d\mu}{dv} < 0$$

is established while an inequality of $$\frac{dv}{dt} < 0$$

is established, as is apparent from FIG. 9. As a result, as inequality of $$\frac{d\mu}{dt} > 0$$

as represented by the following formula (3) is established. This suggests that the second term as identified by a bracket on the right side of Formula (1) has an effect on the jerk value J, that is, the behavior of the jerk value J becomes very complicated in comparison with the case as represented by Formula (2).

$$\frac{d\mu}{dt} = \frac{d\mu}{dv} \cdot \frac{dv}{dt} > 0 \quad (3)$$

When a technical idea of keeping clutch hydraulic pressure constant as represented by a formula of $$\left( \frac{dP}{dt} = 0 \right)$$

is employed for the purpose of reducing effect caused by $\mu$ in Formula (1), the jerk value J can be represented by the following formula (4).

$$J = \frac{KGP_0}{I} \cdot \frac{d\mu}{dt} \quad (4)$$

where $P_o$ designates a value of clutch hydraulic pressure at the time when clutch hydraulic pressure is intended to be kept constant.

When Formula (4) is used, a point where hydraulic pressure is changed to keep clutch hydraulic pressure constant can be known by previously obtaining a value $P_o$ of clutch hydraulic pressure with the aid of simulation or the like which is carried out with respect to G and I, wherein the value $P_o$ of clutch hydraulic pressure is so defined that the jerk value J is identified as a target value.

Incidentally, a relation between $P_o$ and $(d\mu)/(dt)$ is not kept constant but it depends on load (mainly, slope climbing angle) and amount of throttling. For the reason both the slope climbing angle and the amount of throttling should be detected in order to know the above-mentioned point.

The amount of throttling, one of the abovenoted parameters is easy to be detected but detection of the slope climbing angle during running of a vehicle is practically difficult. To obviate this difficulty the following method is employed.

Figure 13:
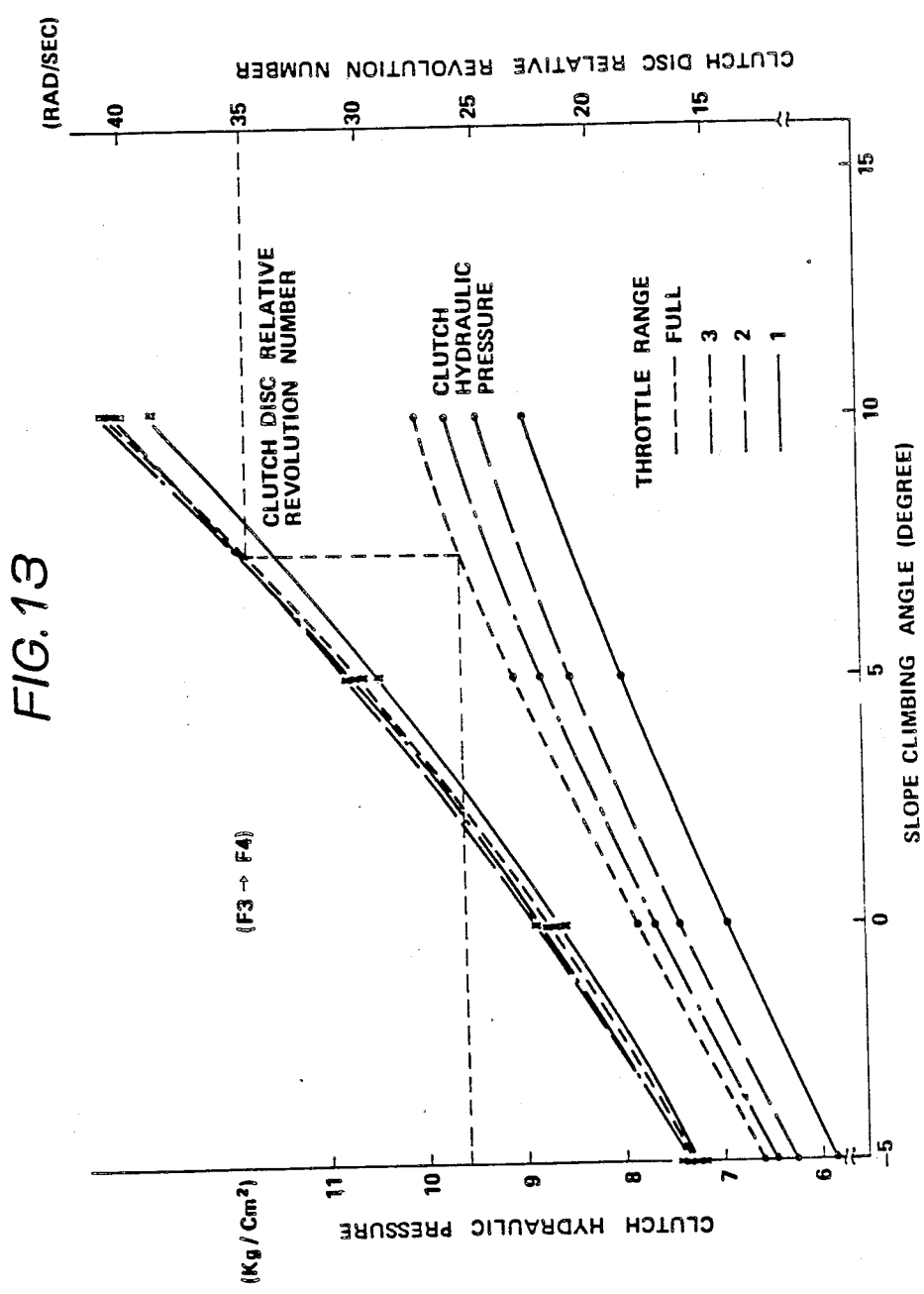
FIG. 13 is a graph exemplifying a relation between clutch hydraulic pressure and clutch disc relative revolution number relative to slope climbing angle which is effective for maintaining jerk value at a level of target value.

FIG. 13 exemplifies clutch hydraulic pressure $P_o$ and clutch disc relative revolution number using slope climbing angle and amount of throttling as parameters, wherein both the clutch hydraulic pressure $P_o$ and the clutch disc relative revolution number are determined so as to keep the jerk value J at a level of target value. It should be noted that the relation as illustrated in the drawing is obtained by way of simulation.

When it is assumed that both the slope climbing angle and the amount of throttling can be detected, the above-mentioned point where hydraulic pressure is changed, that is, hydraulic pressure value $P_o$ or clutch disc relative revolution number usable when keeping clutch hydraulic pressure constant are simultaneously obtainable by utilizing the relation as shown in the drawing. However, since slope climbing angle is difficult to be detected as mentioned above, the above-mentioned point is determined in the following manner.

Namely, it is possible to detect both clutch hydraulic pressure and clutch disc relative revolution number. Thus, they are detected during transition period of clutch engagement and their values are then compared with one another whereby the time point when they fulfill the relation as illustrated in FIG. 13 is determined as change point. When it is assumed that, for instance, clutch disc relative revolution number reaches 35 rad/sec when clutch hydraulic pressure is kept at a level of 9.6 Kg/cm$^2$ while an amount of throttling is set to a full range, this time point is determined as change point. In this case it is natural that hydraulic pressure value $P_o$ at which clutch hydraulic pressure is kept constant amounts to 9.6 Kg/cm$^2$. At this change point slope climbing angle amount to about 7.3 degrees.

Figure 14:
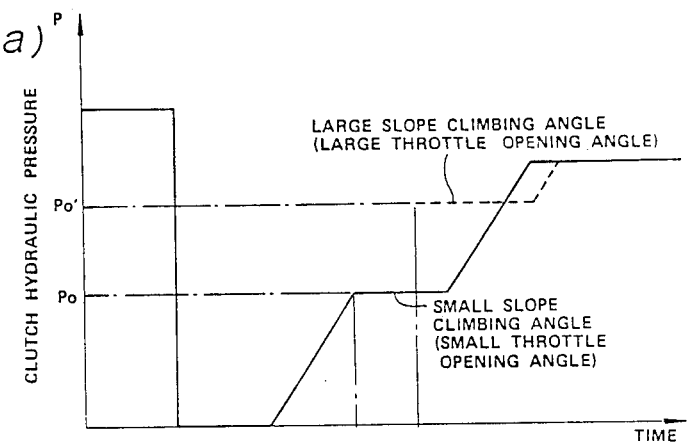
FIGS. 14a and 14b are graphs exemplifying a relation between clutch hydraulic pressure and clutch disc relative revolution number in the case where clutch hydraulic pressure change point is determined on the base of the relation as shown in FIG. 13.
Figure 14:
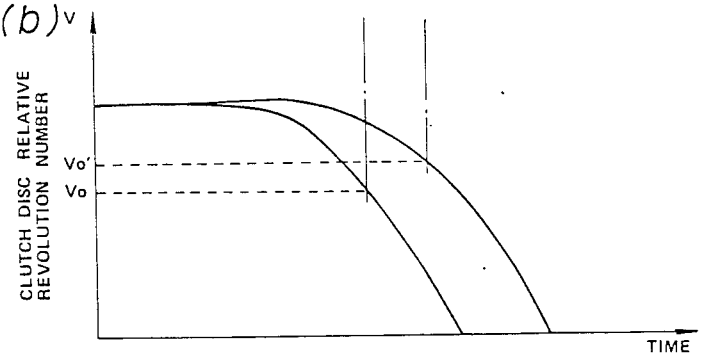

When taking into account the situation that dp/dt in Formula (1) is selected and clutch hydraulic pressure increases in a monotone in accordance with the thus selected (dP)/(dt) as illustrated in FIG. 14(a), it is found that disc relative revolution number decreases in a monotone as illustrated in FIG. 14(b). Therefore, the situation where clutch hydraulic pressure and disc relative revolution number fulfils the relation as illustrated in FIG. 13 is existent without fail whereby change point can be determined by way of the steps as mentioned above.

FIG. 13 illustrates the relation among parameters as mentioned above during speed change from F3 to F4 and the relation among a plurality of parameters can be previously determined by way of simulation in accordance with the manner of various speed changes.

After the change point is discriminated in the above-described manner, the jerk value J can be held at target value by keeping clutch hydraulic pressure $P_o$ constant at the change point. As will be described later, when clutch engagement is completed and thereby disc relative revolution number is reduced to a level of zero, clutch hydraulic pressure is caused to increase to a level of predetermined pressure in order to assure that the clutch is brought in the more tightly engaged state.

As will be readily understood from the above description, in order that the jerk value is kept constant during the transition period of speed change it is necessary that clutch hydraulic pressure is increased by properly selecting (dP)/(dt) in Formula (2) and clutch hydraulic pressure is kept at level which is determined at the time point when the situation where clutch hydraulic pressure and clutch disc relative revolution number fulfill the relation as illustrated in FIG. 13 is reached during increase of clutch hydraulic pressure.

Figure 1:
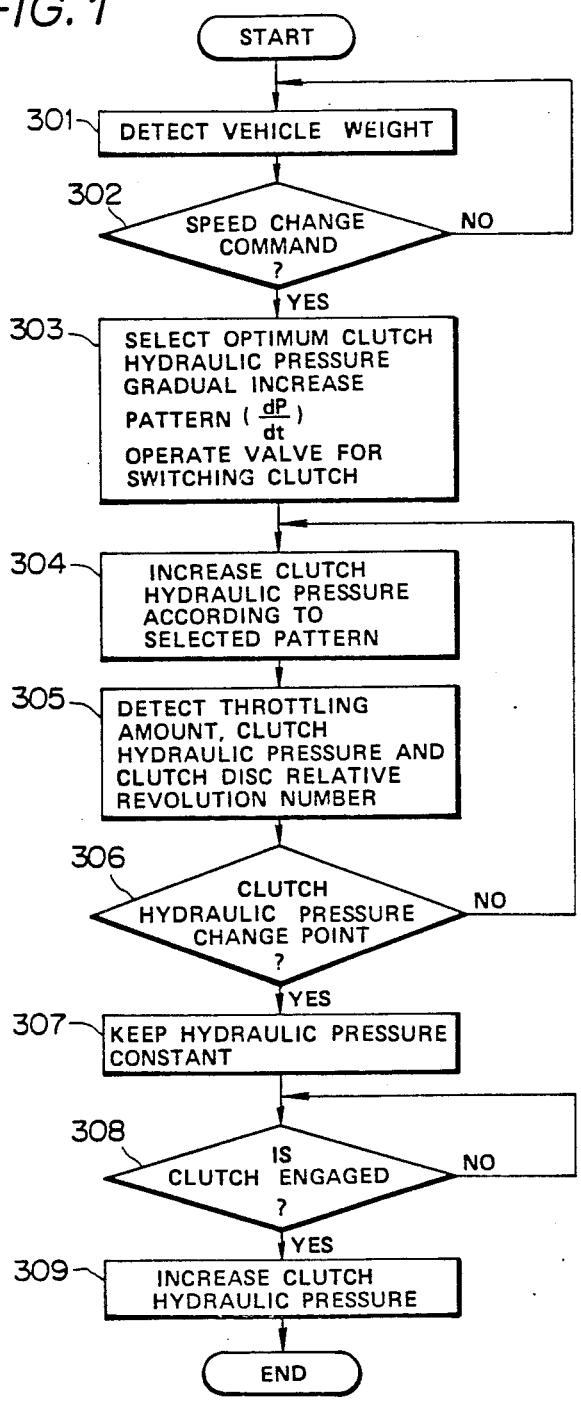
FIG. 1 is a flow chart illustrating a method of controlling speed change clutches in accordance with an embodiment of the present invention.

FIG. 1 is a flow chart which concretely illustrates the steps of controlling of clutch hydraulic pressure as mentioned above and FIG. 2 schematically illustrates an example of structure of an automatic speed change apparatus to which the method of the invention is applied, wherein the above-mentioned steps of controlling are carried out by means of a controller 1 which constitute a component of the apparatus.

Figure 2:
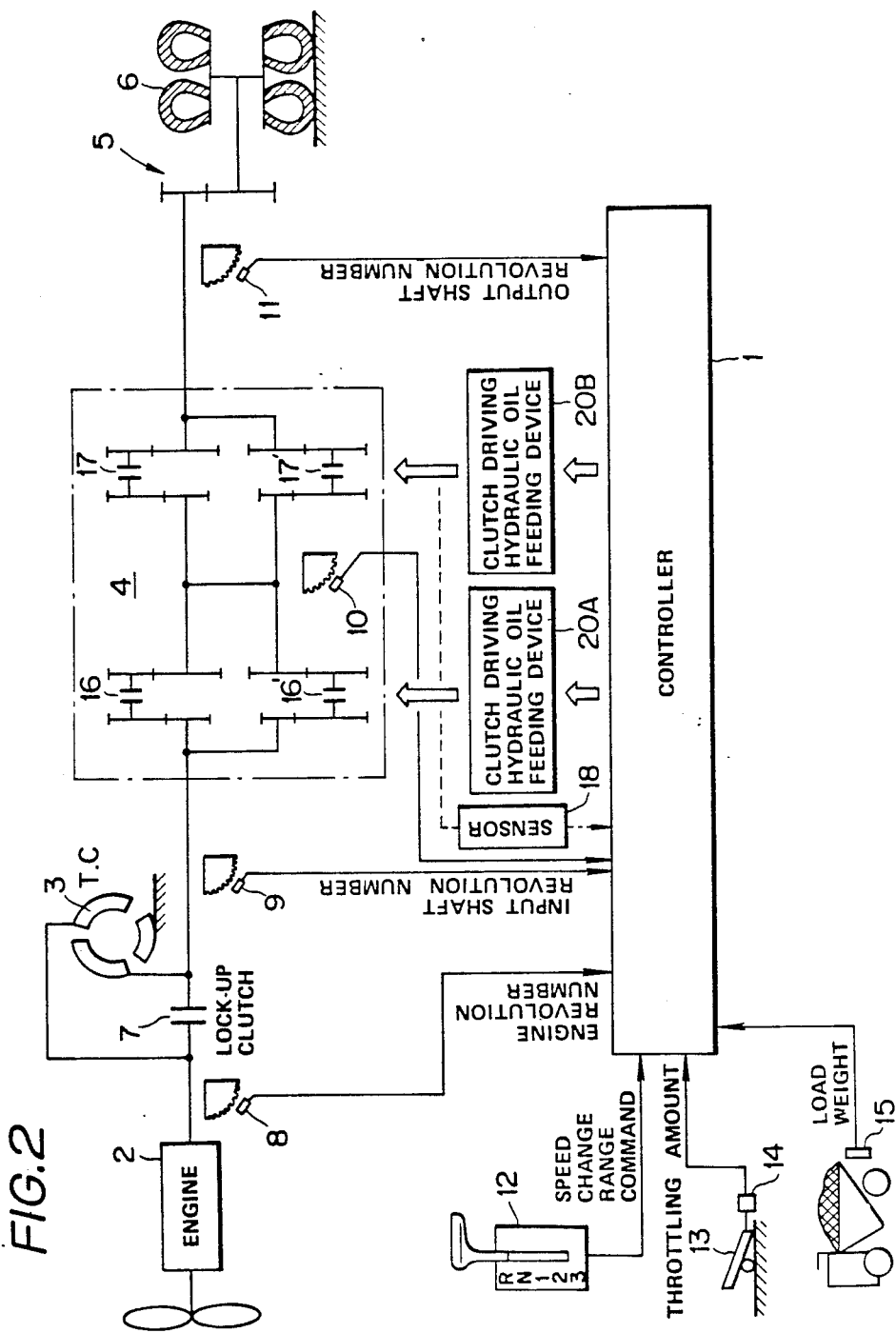
FIG. 2 is a block diagram schematically illustrating an example of automatic speed changing apparatus to which the method of the present invention is applied.

Referring to FIG. 2, output generated by the engine 2 is transmitted to a gear type power transmission 4 by way of a torque convertor 3 and output from the power transmission 4 is then transmitted to driving wheels 6 by way of a speed reduction unit 5 located at the final stage. It should be noted that a lock-up clutch 7 is interposed between the input and output shafts of the torque convertor 3 to make direct power connection therebetween.

As is apparent from the drawing, the engine 2 is provided with an engine rotation sensor 8 adapted to output the number of pulse signals corresponding to the number of revolutions of the engine 2 and the power transmission 4 is provided with rotation sensors 9, 10 and 11, wherein the rotation sensor 9 outputs the number of pulse signals corresponding to the number of revolutions of the input shaft of the power transmission 4, the rotation sensor 10 does the number of pulse signals corresponding to that of the intermediate shaft of the same and the rotation sensor 11 does the number of pulse signals corresponding to that of the output shaft of the same. Output from each of these sensors is delivered to the controller 1. Further, range command signal outputted from a speed change range commander 12, output from a throttling amount sensor 14 operatively associated with a throttle pedal 13 and output from a loaded weight sensor 15 disposed at the position located in the vicinity of a vessel of the vehicle are also delivered to the controller 1.

The power transmission 4 is provided with hydraulic clutches 16 and 16' disposed on the driving side for the purpose of selecting of speed stage and hydraulic clutches 17 and 17' on the driven side. Hydraulic pressure of hydraulic oil fed to these clutches 16, 16', 17 and 17' is controlled by means of electronical control type clutch driving hydraulic oil feeding devices 20A and 20B which will be described later and hydraulic pressure of hydraulic oil delivered from the clutch driving hydraulic oil feeding devices 20A and 20B is detected by means of a hydraulic pressure sensor 18.

Figure 3:
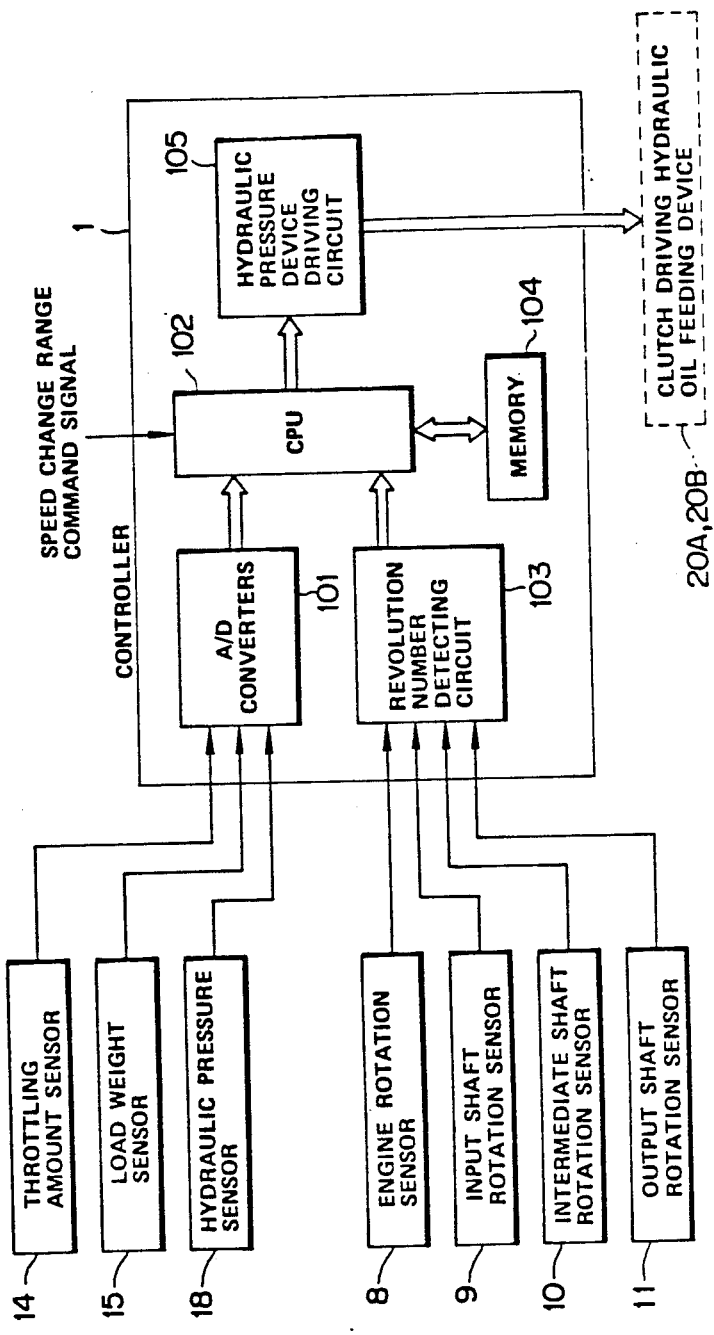
FIG. 3 is a block diagram exemplifying the inner structure of a controller shown in FIG. 2.

FIG. 3 schematically illustrates the inner structure of the controller 1 by way of block diagram.

As is apparent from the drawing, output from the sensors 14, 15 and 18 is transmitted to CPU 102 via A/D convertor 101 and moreover output from the sensors 8 to 11 is transmitted to CPU 102 via a revolution number detecting circuit 103 which comprises counter, F-V convertor and others. It should be noted that CPU 102, A/D convertor 101 and revolution number detecting circuit 103 are incorporated in the controller 1.

Further, the controller 1 is provided with a plurality of memories 104 in order that gradual increase pattern of clutch hydraulic pressure for keeping the jerk value J as shown in Formula (2) at a level of target value (see FIG. 12) is selected in dependence on weight of vehicle and speed stage. The relation for discriminating pressure change point as shown in FIG. 13, that is, the relation among clutch hydraulic pressure for keeping the jerk value J in Formula (1) at a level of target value, clutch disc relative revolution number and amount of throttling are stored in the memories 104 in dependence on the manner of individual speed change.

A hydraulic pressure device driving circuit 105 serves to drive electric actuators and electromagnetically actuated valves in the clutch driving hydraulic oil feeding devices 20A and 20B.

Figure 4:
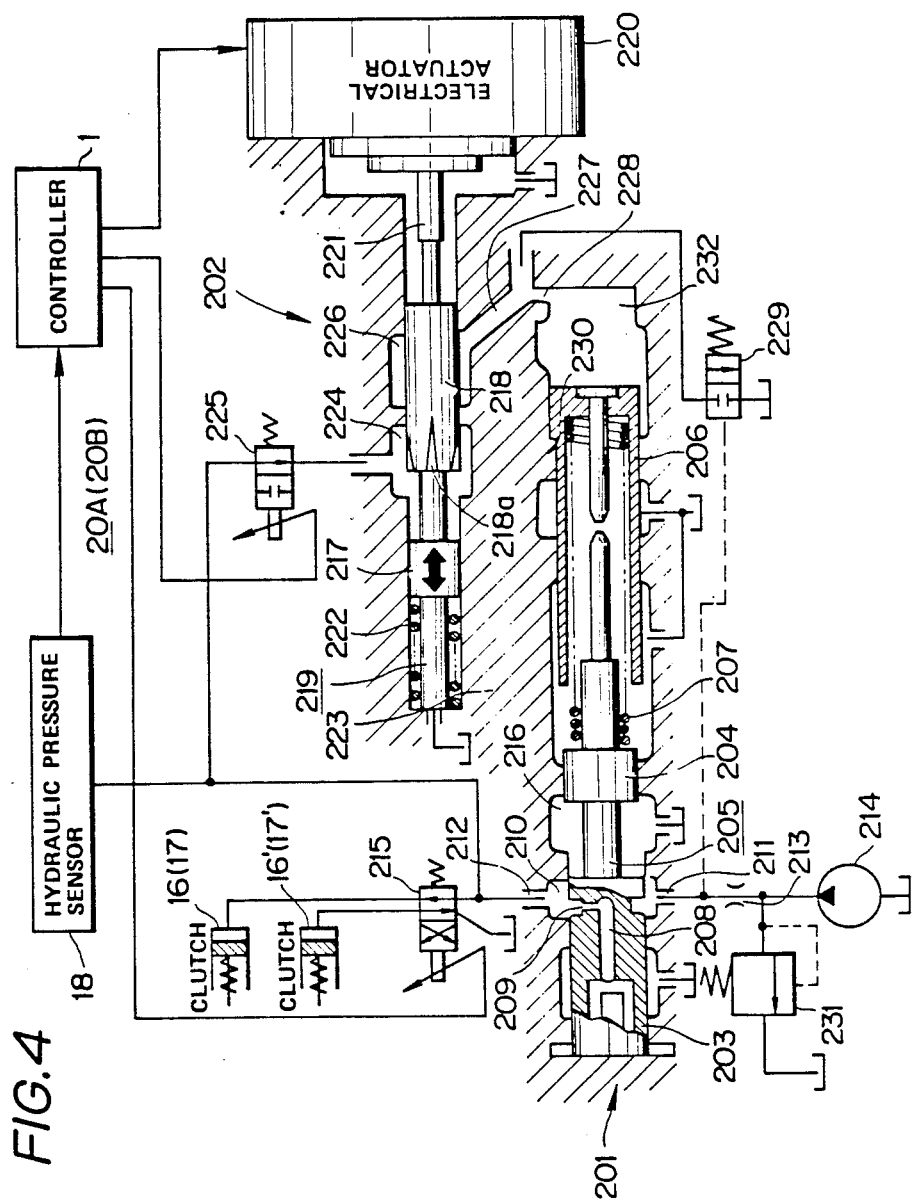
FIG. 4 is a schematic view exemplifying the structure of an electronically controlled type clutch driving hydraulic oil feeding device shown in FIG. 2.

FIG. 4 schematically illustrates an example of structure of the clutch driving hydraulic oil feeding device 20A. It should be noted that the other clutch driving hydraulic oil feeding device 20B is constructed in the quitely same manner as the clutch driving hydraulic oil feeding device 20A.

The hydraulic oil feeding device 20A includes a relief valve 201 and a throttle valve 202. The relief valve 201 is provided with a spool 205 and a load piston 206, the spool 205 including a first piston portion 203 and a second piston portion 204. A spring 207 is interposed between the spool 205 and the load piston 206. The first piston portion 203 is formed with a hydraulic chamber 208 which is communicated with a hydraulic chamber 210 via a passage 209.

The hydraulic chamber 210 has an input port 211 and an output port 212. The input port 211 is hydraulically connected to a hydraulic pump 211 via a throttle 213, while the output port 212 is hydraulically connected to the clutches 16 and 16' via an electromagnetically actuated switching valve 215. A hydraulic chamber 216 is defined by the piston portions 203 and 204 in the area located rightwardly of the hydraulic chamber 210 and it is communicated with a drain tank. As will be described later, the hydraulic chamber 216 functions as a relief passage for pressurized hydraulic oil in the hydraulic chamber 216.

On the other hand, the throttle valve 202 includes a spool 219 which comprises a first piston portion 217 and a second piston portion 218. To assure that the right end face of the second piston portion 218 normally abuts against a movable rod 221 of the electrical actuator 220, the spool 219 is urged in the rightward direction under the effect of resilient force of a spring 222.

A hydraulic chamber 224 formed in the throttle valve 202 is hydraulically connected to the output port 212 of the relief valve 201 via an electromagnetically actuated switching valve 225. Further, a hydraulic chamber 226 formed in the area located rightwardly of the hydraulic chamber 224 is hydraulically connected to a port 228 of the relief valve 201 via a hydraulic passage 227. The port 228 is opened at the right end of a space 232 which is formed by the right end face of the load piston 206 and the valve body 223. The port 228 is hydraulically connected to a drain tank via a switching valve 229 adapted to operate using hydraulic pressure in the hydraulic chamber 210 as pilot pressure.

Figure 5:
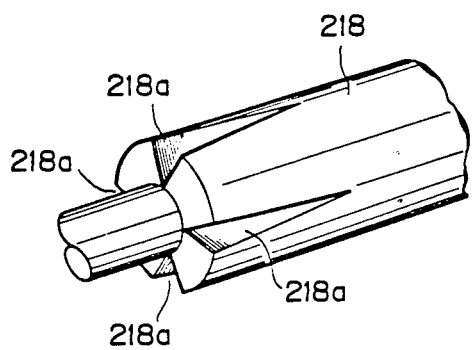
FIG. 5 is a perspective view of a spool in a throttle valve shown in FIG. 4, particularly illustrating the geometrical configuration of slits formed on the spool.

The second piston portion 218 is located in such a manner that it extends between both the hydraulic chambers 224 and 226. As shown in FIG. 5, the left end part of the second piston portion 218 is formed with four slits 218a which extend in the axial direction. As is apparent from the drawings, each of the slits 218a is designed in the wedge-shaped confuration in such a manner that both the width and the depth decrease gradually as seen from the left to the right whereby it functions as passage through which pressurized hydraulic oil flows between both the hydraulic chambers 224 and 226.

The electrical actuator 220 has such a function that the rod 221 is displaced in the leftward or rightward direction in response to a command issued from the controller 1. In the illustrated embodiment a pulse motor is incorporated in the electrical actuator 220 as driving power source for driving the rod 221.

When the second piston portion 218 is displaced in the rightward direction from the position as shown in FIG. 4 as the actuator 220 becomes activated, passages through which the hydraulic chamber 224 is communicated with the hydraulic chamber 226 are formed between the slits 218a and the inner wall of the valve body 223. The larger the extent of displacement of the spool 219 in the rightward direction, the larger the passage area of each of the slits 218a.

Figure 6:
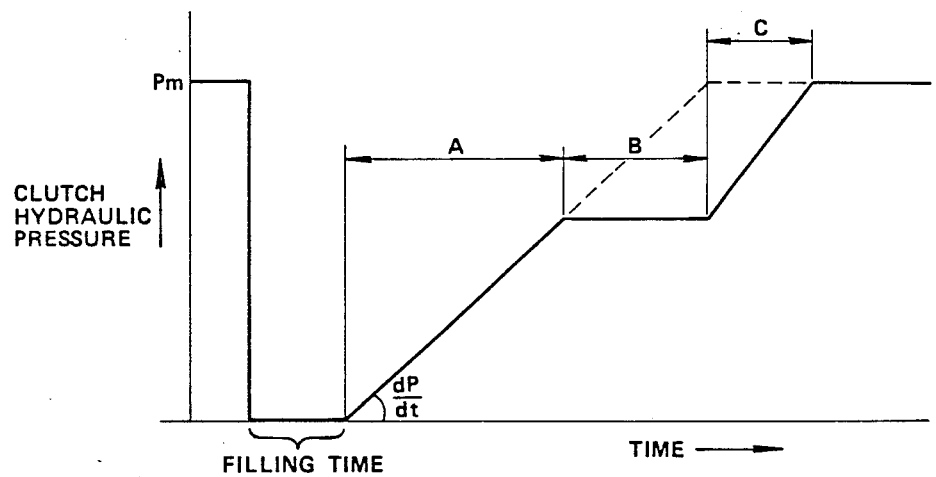
FIG. 6 is a characteristic diagram exemplifying control characteristics of clutch hydraulic pressure for the method of the present invention.

When it is assumed that the speed change clutch 16 is fed with pressurized hydraulic oil and thereby it is brought into the fully engaged state, hydraulic pressure exerted on the clutch 16, that is, hydraulic pressure in the hydraulic chamber 210 reaches the maximum value Pm as shown in FIG. 6. At this moment the load piston 206 assumes the position where the highest hydraulic pressure is generated, that is, the position where it abuts against a stopper 230 in the valve body 223, while the spool 205 assumes the position where force given by multiplying the area of the right end face of the hydraulic chamber 208 in the piston portion 203 by the above-noted highest hydraulic pressure is balanced with repulsive force of the spring 207. When it is assumed that the aforesaid area is represented by Ac, hydraulic pressure in the hydraulic chamber 208 (corresponding to clutch hydraulic pressure) is represented by P, spring constant of the spring 207 is represented by K and an amount of variation of the length of the spring 207 is represented by x, the following balance formula is established.

$$A_c \cdot P = K \cdot x \tag{5}$$

Incidentally, pressure of hydraulic oil delivered from the pump 214 is properly controlled to a level (for instance, 35 Kgf/cm²) by operating a pressure control valve 231 and thereafter thus pressure controlled hydraulic oil is fed to the hydraulic chamber 210.

Next, description will be made below with reference to FIG. 1 as to how clutch hydraulic pressure is controlled when the clutch 16' is brought in engagement while the clutch 16 is released from the engaged state.

The controller 1 detects weight of vehicle comprising loaded weight detected by means of the loaded weight sensor 15 plus weight of the body of vehicle (step 301). Then, judgement is made on the base of output from each of the engine rotation sensor 8, the throttling amount sensor 14 and the speed change range commander 12 as to whether speed change should be carried out or not (step 302). Since processing of judgment on speed change made in that way is performed in the same manner as in the case of a conventional automatic speed change apparatus, repeated description will not be required.

When judgement is made in such a manner that speed change is necessary, the optimum clutch hydraulic pressure gradual increase pattern considered as suitable on the base of detected vehicle weight and speed stage to be selected is read out of the memories 104. Namely, the optimum clutch hydraulic pressure gradual increase pattern (dP)/(dt) corresponding to vehicle weight I and speed reduction ratio constant G is selected from a plurality of clutch hydraulic pressure gradual increase patterns as shown in FIG. 12. At the same time, switching operation of the electromagnetically actuated switching valve 215 is initiated (step 303).

Figure 7:
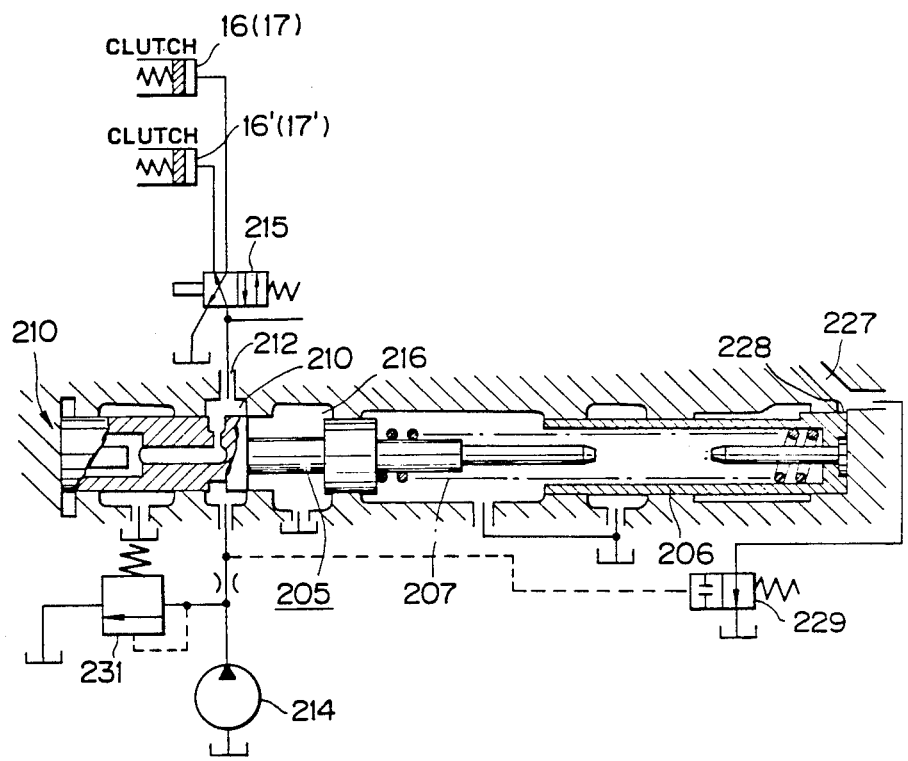
FIG. 7 is a schematic view illustrating how the relief valve is operated.

When the switching valve 215 is actuated as shown in FIG. 7, pressurized hydraulic oil exerted on the clutch 16 is drained via the switching valve 215 whereby the clutch 16 is brought into the disengaged state. At the same time the output port 212 of the hydraulic chamber 201 in the relief valve 201 is hydraulically connected to the clutch 16' and thereby feeding of pressurized hydraulic oil to the clutch 16' is initiated. At this moment hydraulic pressure in the hydraulic chamber 201 is quickly reduced to a value close to about zero as shown in FIG. 6 but this is attributable to the fact that hydraulic oil abruptly flows into the clutch pack of the clutch 16' which has been kept in the empty state.

When hydraulic pressure in the hydraulic chamber 201 decreases quickly, this causes operation of the switching valve 229 adapted to be operated using the aforesaid hydraulic pressure as pilot pressure to be initiated. As a result, hydraulic oil held in the space 232 as defined by the load piston 206 and the inner wall of the valve body 223 is quickly drained via the switching valve 229 whereby the load piston 206 is returned to the stroke end as shown in FIG. 7 under the effect of the repulsive force of the spring 207. When the piston 206 is returned to the position as mentioned above, the spring 207 assumes its original length at the state where no compression or tension is exerted thereon.

When the clutch 16′ is filled with hydraulic oil, that is, when a period of filling time is over as shown in FIG. 6, hydraulic pressure in the hydraulic chamber 210 starts increasing and thereby the switching valve 229 is reset to resume the operative state as shown in FIG. 4.

After the controller 1 executes processing as identified by step 303, clutch hydraulic pressure is caused to increase in accordance with a hydraulic pressure gradual increase pattern which is selected in the step 303 (step 304).

Specifically, since the hydraulic chamber 210 in the relief valve 201 is communicated with the hydraulic chamber 224 in the throttle valve 202 via an electromagnetically actuated switching valve 225, pressurized hydraulic oil flowing from the output port 212 of the hydraulic chamber 210 is delivered to both the clutch 16′ and the hydraulic chamber 224. Then, when communication is established between both the hydraulic chambers 224 and 226 via the slits 218a by displacing the throttle valve 219 in the rightward direction, pressurized hydraulic oil of which pressure is determined corresponding to an amount of displacement of the slits 218a is delivered to the port 228 via the hydraulic oil passage 227 and thus delivered hydraulic oil generates hydraulic pressure which is exerted on the load piston 206 to displace the latter in the leftward direction.

When it is assumed that an amount of displacement of the load piston 206 is represented by x, its displacement speed (dx)/(dt) is determined in dependence on a flow rate of pressurized hydraulic oil flowing into the space 232 as shown in FIG. 4. The above-noted amount of displacement x suggests a length of spring x in Formula (5). When the relation as represented by the following formula is obtained from Formula (5), it results that clutch hydraulic pressure P is determined in dependence of a flow rate of pressurized hydraulic oil flowing through the slits 218a.

$$\frac{dP}{dt} = \frac{K}{Ac} \cdot \frac{dx}{dt} \quad (6)$$

Namely, a required clutch hydraulic pressure gradual increase pattern can be obtained by controlling the position where the spool 219 is displaced and thereby adjusting a flow rate of pressurized hydraulic oil flowing through the slits 218a.

During the step 304 the controller 1 executes processing for applying to the electrical actuator a signal by means of which the above-mentioned clutch hydraulic pressure gradual increase pattern as selected in that way can be realized whereby clutch hydraulic pressure increases gradually, for instance, in such a manner as shown in FIG. 6.

Next, the controller 1 detects an amount of throttling and clutch hydraulic pressure on the base of output from the sensors 14 and 18 and moreover it detects clutch disc relative revolution number of the clutch 16′ on the base of output from the input shaft rotation sensor 9 and the intermediate shaft rotation sensor 10 (step 305). Then, judgement is made as to whether or not thus detected amount of throttling, clutch hydraulic pressure and clutch disc relative revolution number fulfill the relation stored in the memories 104 and exemplified in FIG. 13, that is, judgement is made as to whether or not these parameters represent the relation which suggests change point of clutch hydraulic pressure (step 306). Incidentally, in view of the fact that the relation represented by the parameters shown in FIG. 13 is related to the manner of speed change (F3→F4) as mentioned above, change point of clutch hydraulic pressure is determined on the base of the relation represented by the parameters corresponding to any change relative to the manner of speed change.

Processing during the steps 304 and 305 is repeated until the result of judgement obtained during the step 306 is identified as YES. Once the result of judgement is identified as YES, processing for holding clutch hydraulic pressure at a value obtained at that time is executed (step 307).

Processing during the step 307 comprises such a content that the spool 219 in the throttle valve 202 is displaced in the leftward direction to interrupt communication between both the hydraulic chambers 224 and 226. By virtue of arrangement made in that way feeding of pressurized hydraulic oil to the relief valve 201 through the hydraulic passage 227 is interrupted whereby displacement speed of the load piston is reduced to zero, that is, a formula of $$\frac{dP}{dt} = 0$$

is established.

It should be noted that in the case where the electrical actuator 220 is constructed in the pulse motor type there is a fear that hydraulic pressure change point is appreciably deviated from a predetermined one due to delayed operation of the actuator. In the illustrated embodiment, to obviate this problem operation of the electromagnetically actuated switching valve 225 is initiated at the time point when the result of judgement during the step 306 is identified as YES whereby feeding of pressurized hydraulic oil to the hydraulic chamber 224 is interrupted.

After clutch hydraulic pressure is kept constant, the controller 1 is so operated that judgement is made as to whether the clutch 16′ is brought in the fully engaged state or not (step 308). Specifically, since clutch disc relative revolution number of the clutch 16′ is reduced to zero when it has completed engagement operation, judgement can be made on the base of output from the sensors 9 and 10 as to the fact that engagement operation has been completed. Once judgement is made such that operation of engagement is completed, clutch hydraulic pressure is caused to increase again in order to assure that the clutch is brought in the more tightly engaged state.

Thus, according to the illustrated embodiment hydraulic pressure in the clutch 16′ is controlled in such a manner as typically illustrated in FIG. 6 whereby the jerk value J during the transistion period of engagement of the clutch 16′ is maintained at a level of target value.

It should of course be understood that the target value of jerk value J is set to such a value that shock caused by speed change can be reduced as far as possible and acceleration after completion of speed change and other factors are taken into account at the time of setting of the target value in that way.

When the clutch 17 or 17′ as shown in FIG. 2 is brought in the engaged state, hydraulic pressure in the clutch is changed in the same manner as in the foregoing case in accordance with a control signal transmitted from the controller 1 to the clutch driving hydraulic oil feeding device 20B. In this case clutch disc relative revolution number of the clutch 17 or 17' is detected on the base of output from the intermediate rotation sensor 10 and the output shaft rotation sensor 11.

Incidentally, the following table typically illustrates the relation between clutch to be engaged and speed stage.

|         | 16 | 16' | 17 | 17' |
|---------|----|-----|----|----|
| 1 speed | o  |     | o  |     |
| 2 speed |    | o   | o  |     |
| 3 speed | o  |     |    | o   |
| 4 speed |    | o   |    | o   |

In the above-described embodiment, as will be apparent from Formula (6), the larger the displacement speed of the load piston 206 in the leftward direction, the larger the increase gradient (dP/(dt) of clutch hydraulic pressure.

Further, the balance relation as represented by Formula (5) is maintained under the relief effect of the relief valve 201. This is attributable to the fact that when the balance relation is lost, the spool 205 is caused to move in the leftward direction and pressurized hydraulic oil in the hydraulic chamber 210 is relieved to the hydraulic chamber 216 whereby another balance relation is resumed.

In the above-described embodiment any confirmation is not made as to whether or not clutch hydraulic pressure is increased in accordance with the specified increase gradient this confirmation can be made in the following manner.

Figure 8:
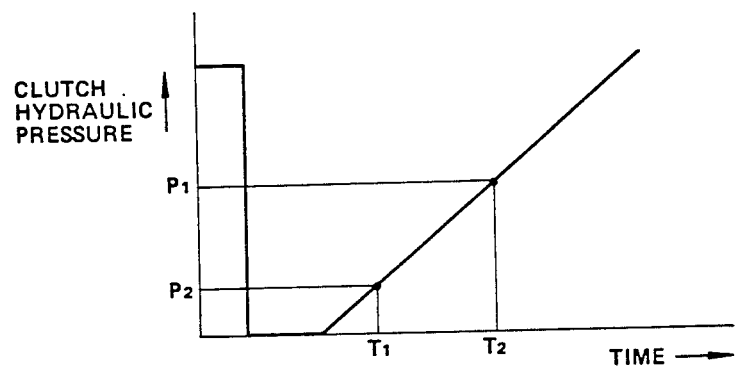
FIG. 8 is a graph illustrating a method of detecting an increase rate of clutch hydraulic pressure.

Namely, as shown in FIG. 8, lower clutch hydraulic pressure $P_1$ and higher clutch hydraulic pressure $P_2$ are preset and time $T_1$ which elapses until actual clutch hydraulic pressure reaches $P_1$ and $T_2$ which elapses until it reaches $P_2$ are measured on the base of output from the sensor 18. Then, increase gradient P/S of clutch hydraulic pressure can be calculated in accordance with the following formula.

$$P/S = \frac{P_2 - P_1}{T_2 - T_1} \tag{7}$$

Thus, when clutch hydraulic pressure is controlled, the controller 1 executes calculation of Formula (7) and a comparison is made between actual hydraulic pressure increase gradient corresponding to the result of calculation and increase gradient based on command whereby deviation one from another can be obtained.

When certain deviation is recognized, subsequent command value is properly corrected and thereby it becomes possible to control clutch hydraulic pressure more exactly.

It should be noted that the above-mentioned deviation often occurs due to change of material of hydraulic oil to be used, temperature of the same or the like.

In the above-described embodiment controlling is effected by way of three stages, one of them being such that hydraulic pressure is increased with a predetermined gradient in A zone in FIG. 6 where time change relative to clutch disc friction coefficient μ has no effect on jerk value, other one being such that hydraulic pressure is kept constant in B zone where the above-mentioned time change has an effect on jerk value and another one being such that hydraulic pressure is caused to increase again in C zone after completion of clutch engagement. However, the present invention should not be limited only to this. Alternatively, hydraulic pressure may be contorlled only with the use of hydraulic pressure increase pattern including an extension line of gradient (dP/dt) from A zone as represented by a dotted line in the drawing with the result that practically sufficient speed change shock reduction effect is obtainable.

Incidentally, since hydraulic pressure increase characteristic in C zone is not concerned in speed change shock, it may be determined as required.

Figure 18:
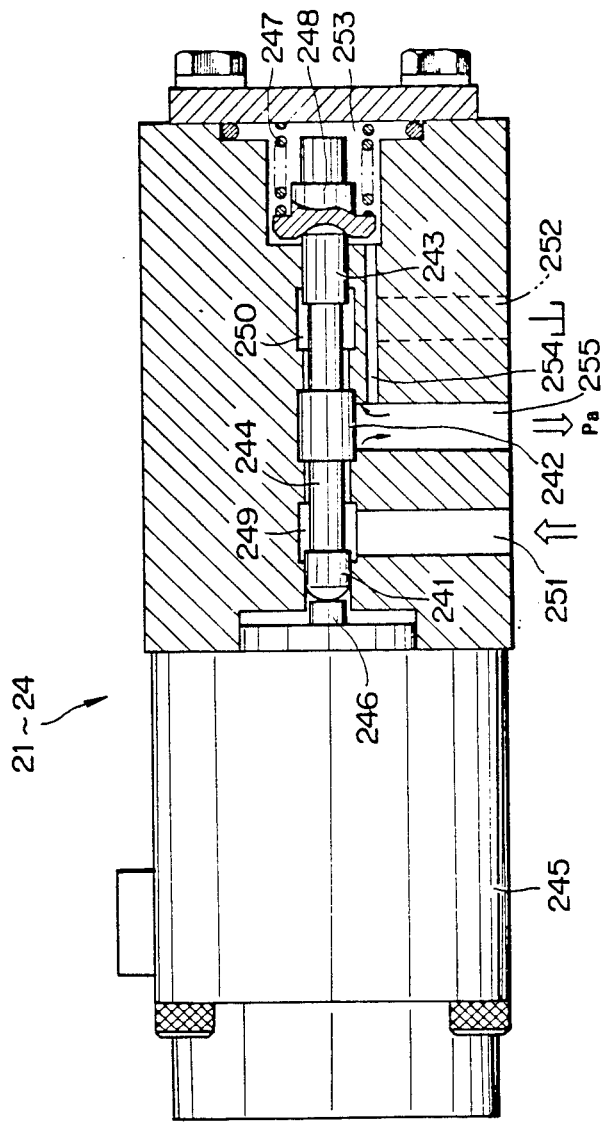
FIG. 18 is a fragmental sectional view illustrating how a pressure control valve shown in FIG. 17 is constructed.

Further, in the above-described embodiment a control valve mechanism is used in which hydraulic pressure increase pattern is unconditionally determined by locating the spool 218 in the throttle valve 202. However, the present invention should not be limited only to this. Alternatively, a control valve of the type in which time change pattern of electrical signal appears in the form of hydraulic pressure change pattern, for instance, a control valve as shown in FIG. 18 to be described later may be used. In this case, since electrical command suggests clutch pressure, the hydraulic pressure sensor 18 can be eliminated but there is a necessity for issuing the above-mentioned electrical command after the time point when filling time as shown in FIG. 6 is over.

Naturally, the above-mentioned embodiment may be applicable not only to an automatic speed change apparatus but also to a manually operable type speed change apparatus.

During the period of filling time all the speed change clutches are not brought in the engaged state and therefore torque transmitted via the transmission is reduced to zero. This means that filling time is a kind of loss time during the period of speed change. As a result, quick speed change is inhibited.

Figure 15:
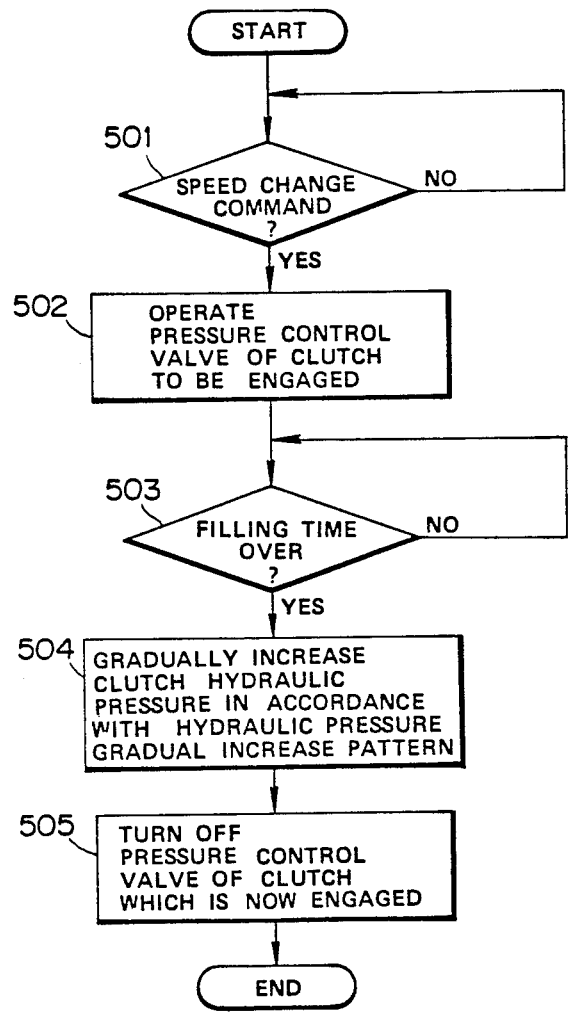
FIG. 15 is flow chart illustrating a method of controlling speed change clutches in accordance with another embodiment of the present invention.

FIG. 15 schematically illustrates an embodiment of the present invention which is intended to resolve the problem relative to filling time as mentioned above, and FIG. 16 schematically illustrates an example of automatic speed change apparatus to which a method in accordance with this embodiment is applicable.

Figure 16:
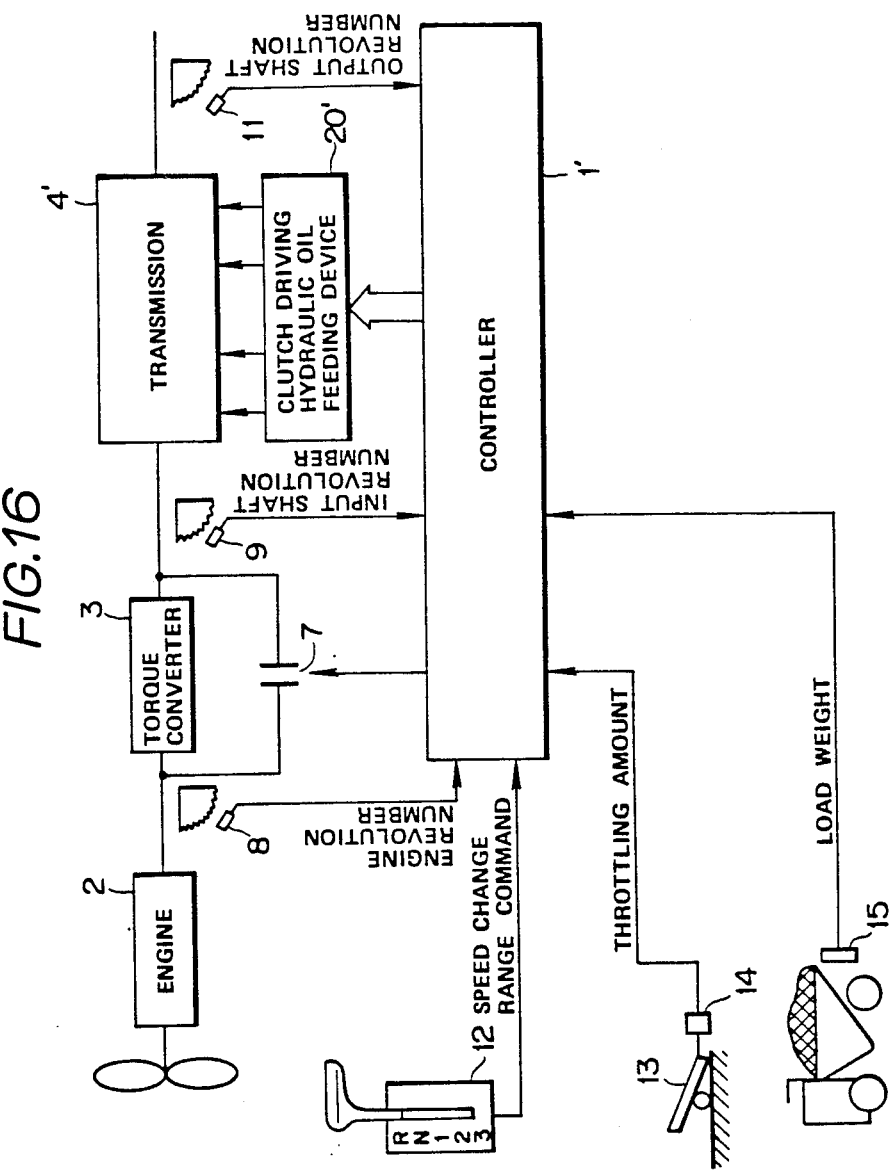
FIG. 16 is a block diagram schematically illustrating an example of automatic speed changing apparatus to which the method of the present invention is applied.

Referring to FIG. 16, same elements as those in FIG. 2 are identified by same reference numerals and elements having similar function to those in FIG. 2 are identified by same reference numerals with prime mark added thereto.

In the automatic speed change apparatus as shown in the drawing the output shaft of an engine 2 is operatively connected to the input shaft of a torque convertor 3 and the input shaft of a transmission 4' is operatively connected to the output shaft of the torque convertor 3 in the same manner as in the apparatus as shown in FIG. 2. Further, a lock-up clutch 7 is interposed between the input and output shafts of the torque convertor 3 so as to allow them to be connected directly to one another.

The output shaft of the engine 2 is equipped with a rotation sensor 8 adapted to output pulse signals corresponding to the number of revolutions of the output shaft and both the input and output shafts of the transmission 4' are equipped with rotation sensor 9 and 11 which function in the same manner as the sensor 8.

Figure 17:
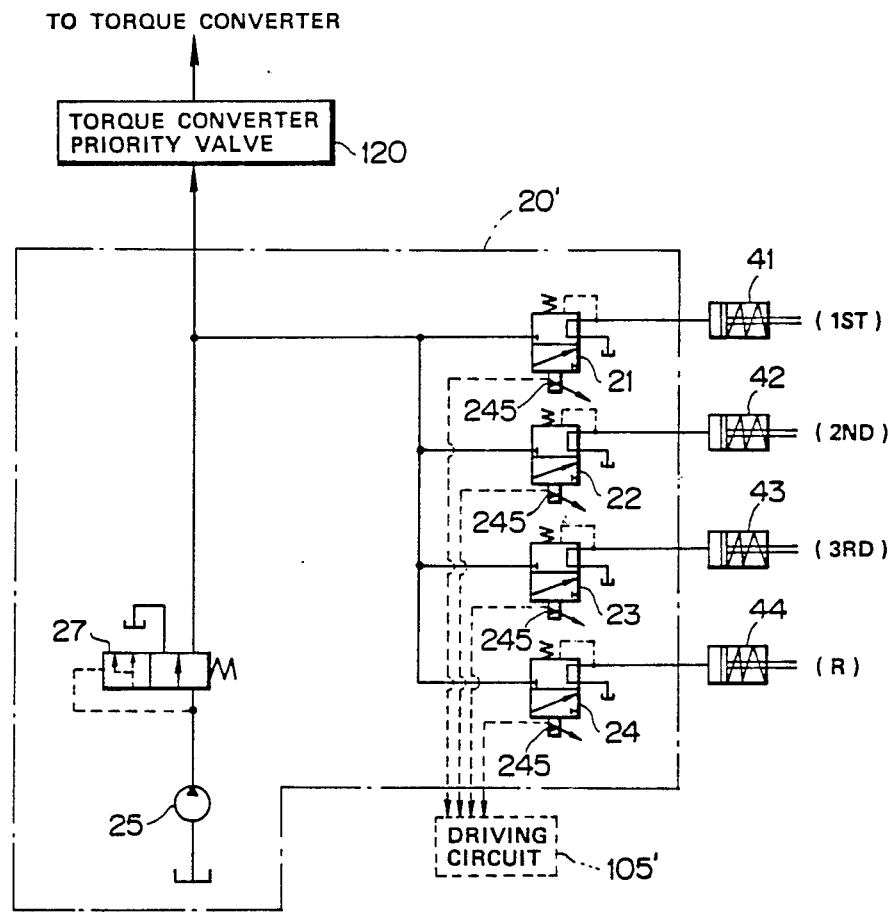
FIG. 17 is a view schematically illustrating how the clutch driving hydraulic oil feeding device shown in FIG. 16 is constructed as well as how the clutch driving hydraulic oil feeding device is operatively connected to the speed change clutches.

The transmission 4' includes four speed change clutches 41, 42, 43 and 44 as shown in FIG. 17 and one of them is selectively brought in the engaged state when one speed stage among first speed, second speed, third speed and rearward movement is selected.

As shown in FIG. 17, the clutch driving hydraulic oil feeding device 20' is provided with electronically controlled type pressure control valves 21, 22, 23 and 24 which serve to deliver controlled hydraulic pressure to the speed change clutches 41, 42, 43 and 44.

FIG. 18 illustrates an example of structure of the pressure control valves 21 to 24. Each of the pressure control valves includes a spool 244 which comprises a first piston portion 241, a second piston portion 242 and a third piston portion 243. The left-hand end of the spool 244 comes in contact with a plunger 246 of a proportion solenoid 245, whereas the right-hand end of the same comes in contact with a retainer 248 which is normally urged in the leftward direction under the effect of resilient force of a spring 247.

Both the first piston portion 241 and the second piston portion 242 define a hydraulic chamber 249 and both the second piston portion 242 and the third piston portion 243 define a hydraulic chamber 250. The hydraulic chamber 249 is communicated with an inlet port 251 and the hydraulic chamber 250 is communicated with a tank port 252.

A hydraulic chamber 253 in which the spring 247 and the retainer 248 are accommodated is communicated with an output port 255 via a passage 254. The second piston portion 242 is located at the one open end of the output port 255. In the illustrated operative state the one open end of the output port 255 is closed with the second piston portion 242.

Figure 19:
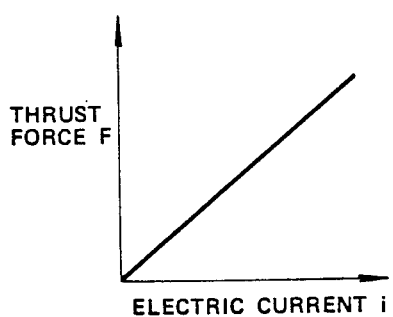
FIG. 19 is a graph illustrating electrical current vs. thrust force characteristic of a proportion solenoid.

The proportion solenoid 245 is disposed as an actuator for the purpose of displacing the spool 244 and its plunger 246 comes in contact with the left end face of the spool 244. As is well known for any expert in the art, the proportion solenoid 245 has such a characteristic performance that thrust force F of the plunger 246 is in proportion to input current i and FIG. 19 illustrates the relation as mentioned above.

As will be apparent from FIG. 17, the input port 251 of each of the hydraulic pressure control valves 21 to 24 is fed with hydraulic oil delivered from the pump 25. It should be noted that hydraulic pressure of thus delivered hydraulic oil is kept at a constant level (for instance, 35 Kg/cm²) under the effect of a relief valve 27. Further, this hydraulic oil is delivered to the torque convertor 3 via a torque convertor priority valve 120.

When the proportion solenoid 245 is actuated and thereby the spool 244 is displaced in the rightward direction, hydraulic oil fed to the input port 251 is caused to flow into the output port 255. At this moment a part of hydraulic oil passing through the output port 255 flows into the hydraulic chamber 253 via the passage 254.

When it is assumed that pressure receiving area on the third piston portion 243 is represented by A and hydraulic pressure in the output port 255, that is, hydraulic pressure in the hydraulic chamber 253 is represented by Pa, force represented by A·Pa is exerted on the spool 244 to displace the latter in the leftward direction. As a result, hydraulic pressure in the hydraulic chamber 253 increases whereby the spool 244 is displaced in the leftward direction. When flowing of hydraulic oil into the output port 255 is interrupted, hydraulic oil is drained from the output port 255 to the tank port 252.

Thus, the spool 244 is so actuated that thrust force F of the plunger is balanced with the abovementioned force A·Pa, that is, the balance relation as represented by the following formula is established.

$$F = A \cdot P_a \quad (8)$$

The spring 247 functions to urge the spool 244 in the leftward direction but in the above description the effect of the spring 247 is neglected due to the fact that a spring having small spring constant is used for the spring 247.

Since the following relation is established between thrust force F of the plunger 246 and driving electric current i of the solenoid 245, $$F = K \cdot i \quad (9)$$

where K: proportion constant, the following relation can be obtained from the combination of Formulas (8) and (9).

$$K \cdot i = A \cdot P_a \quad (10)$$

Thus, hydraulic pressure $P_a$ in the output port 255 is represented by the following formula.

$$P_a = K \cdot (i/A) \quad (11)$$

Figure 20:
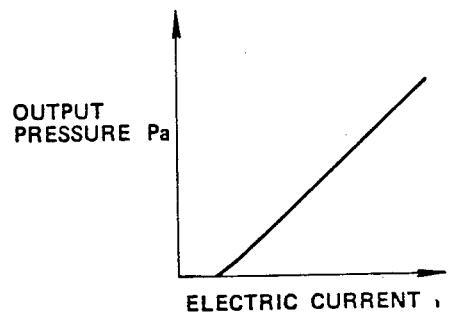
FIG. 20 is a graph illustrating a relation between electrical current of the solenoid and out put pressure of a pressure control valve.

As will be apparent from Formula (11), hydraulic pressure $P_a$ in the output port is in proportion to driving electric current i of the solenoid 245. FIG. 20 schematically illustrates the relation as mentioned above.

Figure 21:
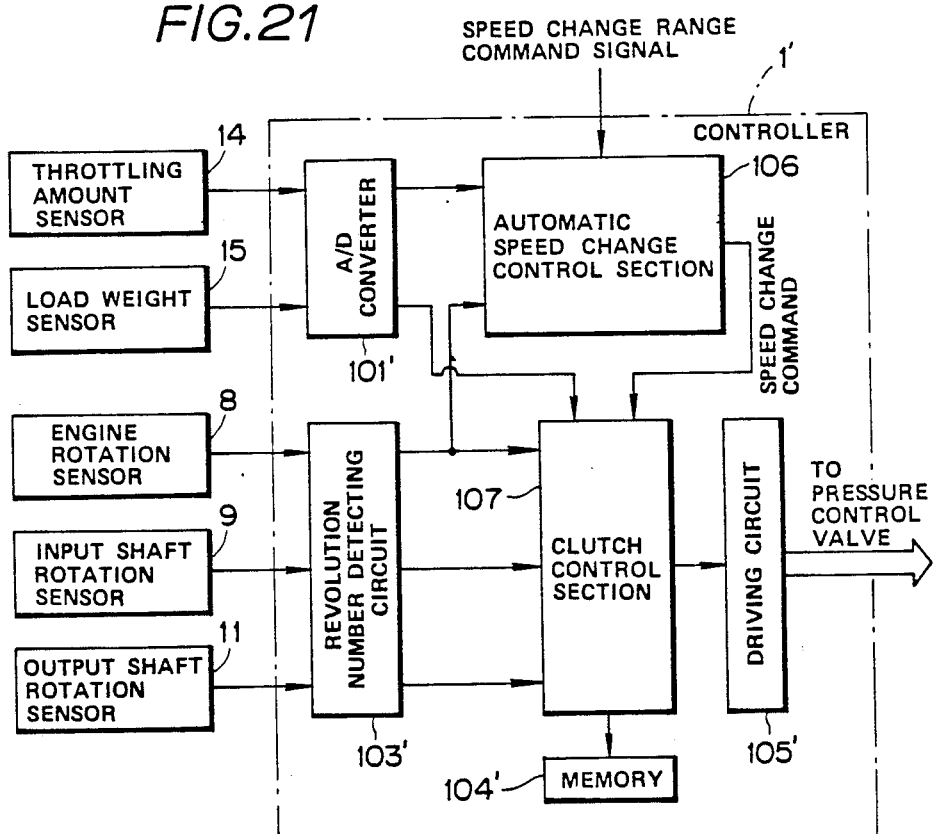
FIG. 21 is a block diagram exemplifying the structure of a controller.

FIG. 21 exemplifies structure of the controller 1' in FIG. 1 by way of block diagram.

The controller 1' is so constructed that output from the throttling amount sensor 14 shown in FIG. 1 is inputted into the automatic speed change control section 106 via A/D convertor 101' and output from the load weight sensor 15 is applied to a clutch control section 107 also via A/D convertor 101'. Further, output from the engine rotation sensor 8 is applied to the automatic speed change control section 106 via revolution number detecting circuit 103 and output from both the input shaft rotation sensor 9 and the output shaft rotation sensor 11 are applied to the clutch control section 107 via the revolution number detecting circuit 103.

Clutch hydraulic pressure gradual increase patterns as illustrated in FIGS. 10 to 12 are previously stored in memories 104'.

The steps of carrying out the method of the invention as shown in FIG. 15 are executed with the aid of the controller 1'.

Now, description will be made below as to the above-mentioned steps. First, judgement is made in the automatic speed change control section 106 on the base of output from the engine rotation sensor 8, the speed change range commander 12 and the throttling amount sensor 14 as to whether speed change should be carried out or not (step 501). Incidentally, processing of the above-mentioned judgement as to speed change is same as in the case of a conventional automatic speed change apparatus and therefore repeated description will not be required.

For instance, when judgement is made to select second speed during the step 501 on the assumption that the speed change clutch 41 shown in FIG. 17 is brought in the engaged state to select first speed, speed change command as to this second speed is outputted from the automatic speed change control section 106. This command is inputted into the clutch control section 107 whereby the latter is activated to operate the pressure control valve 22 for the second speed clutch 42 (step 502). At this moment the pressure control valve 22 is so controlled that a large volume of hydraulic oil is inhibited from flowing into the clutch 42 and thus controlled signal is transmitted to the control valve 22 via a driving circuit 105′ shown in FIG. 21.

Due to the fact that the interior of the clutch pack of the clutch 42 is kept in the empty state at the time point when the control valve 22 is actuated in that way, clutch pressure of the clutch 42 is kept in the substantially zero state until a certain period of time (filling time) elapses after the control valve 22 is actuated, as shown in FIG. 22(b).

Next, judgement is made in the clutch control section 107 as to whether filling time is over or not (step 503). In this embodiment judgement as to termination of filling time is made with the use of a timer which is not shown in the drawing. However, in view of the fact that flowing of hydraulic oil into the clutch 42 is substantially interrupted at the time point when filling time is over, a sensor adapted to detect an occurrence of the above-mentioned phenomenon may be disposed in a hydraulic oil feeding passage in order to detect termination of filling time.

When termination of filling time is discriminated during the step 503, clutch hydraulic pressure gradual increase pattern corresponding to weight of vehicle or speed stage or both of them is read from the memories 104′ and electrical current command signal is outputted from the clutch control section 107 in accordance with the aforesaid pattern (step 504). At the same time the pressure control valve 21 in operative association with the speed change clutch 41 usable for first speed which is now brought in the engaged state is turned off with the aid of the control section 107 (step 505).

As a result, hydraulic pressure in the clutch 42 is caused to gradually increase after the time point when filling time is over, as shown in FIG. 22(b) and hydraulic pressure which has been exerted on the clutch 41 is reduced to a level of zero, as shown in FIG. 22(a). Incidentally, hydraulic pressure in the clutch 42 is maintained at a level of pressure preset for the relief valve 27 after it is increased to the preset pressure.

As will be apparent from a comparison between FIGS. 22(a) and (b) and FIGS. 28(a) and (b), this embodiment has a characterizing feature that speed change is carried out without any occurrence of time loss due to filling time and this type of speed change can be achieved only by hydraulically connecting pressure control valves 21 to 24 to speed change clutches 41 to 44 separately allocated thereto. Incidentally, FIG. 22(c) exemplifies variation of output torque from the transmission 4′ during the period of speed change.

It is found that so-called speed change shock occurs due to difference between output torque from the transmission 4′ just before speed change and output torque from the same immediately after speed change. For the reason an occurrence of speed change shock can be prevented by carrying out speed change in such a manner as to eliminate the torque difference as mentioned above.

When it is assumed that the number of revolutions of input shaft 3 of the torque converter 3 shown in FIG. 3 is represented by $N_p$ and the number of revolutions of output shaft of the same is represented by $N_t$, primary coefficient (STP) and torque ratio (ST) representative of performances of the torque converter 3 can be calculated by obtaining a ratio of the first-mentioned number of revolutions to the last-mentioned number of revolutions, that is, $E=N_t/N_p$. Further, input torque $T_p$ into the torque converter is represented by the following formula, $$T_p = STP \cdot (N_p/1000)^2 \tag{12}$$

and output torque $T_t$ form the torque converter is represented by the following formula.

$$T_t = T_p \cdot ST \tag{13}$$

Thus, a value of output torque $T_t$ from the torque converter can be calculated on the base of the combination of Formulas (12) and (13), primary coefficient (STP) and torque ratio (ST) as noted above.

In the case where output torque $T_t$ from the torque converter has been already obtained at the time point when a certain speed change command as mentioned above is issued, torque $T_B$ appearing on the output shaft of the transmission 4′ at the same time point as the foregoing one can be obtained by using the following formula.

$$T_B = G \cdot T_t \tag{14}$$

where G: gear ratio as measured for the whole transmissions 4′.

On the other hand, friction torque $T_c$ at the starting time of speed change, that is, friction torque $T_c$ at the starting time of speed change for the second speed clutch to be subsequently brought in the engaged state in the above-mentioned embodiment is represented by the following formula.

$$T_c = K_c \cdot \mu \cdot P \tag{15}$$

where
$K_c$: clutch coefficient at the starting time of speed change
$\mu$: clutch friction coefficient at the starting time of speed change which is a function of clutch disc relative rotation speed V
P: clutch hydraulic pressure.

This friction torque $T_c$ can be converted into output shaft torque $T_A$ of the transmission 4′ at the starting time of speed change in accordance with the following formula.

$$\begin{aligned} T_A &= G' \cdot T_c \\ &= K_c \cdot \mu \cdot G' \cdot P \end{aligned} \tag{16}$$

where G′ : gear ratio between clutch to be engaged and output shaft of transmission at the starting time of speed change In order to assure that torque is inhibited from changing at the time of speed change transmission output shaft torque $T_B$ just before speed change as represented by Formula (14) is required to be equal to transmission output shaft torque $T_A$ at the starting time of speed change as represented by Formula (16). Clutch hydraulic pressure of the clutch to be engaged which is adapted to fulfil the condition $T_B = T_A$ is represented by the following formula with reference to Formulas (14) and (16).

$$P = (G \cdot T_t)/(K_c \cdot \mu \cdot G') \tag{17}$$

Incidentally, since clutch friction coefficient μ shown in Formula (17) is a function of clutch disc relative revolution number, it is impossible to previously know it. However, due to the fact that disc relative revolution number at the starting time of speed change can be obtained by the combination of torque convertor output shaft revolution number $N_t$ detected by means of the sensor 9, gear ratio of the transmission 4' before and after speed change and transmission output shaft revolution number detected by means of the sensor 11 it is possible to obtain friction coefficient μ at the starting time of speed change.

Figure 23:
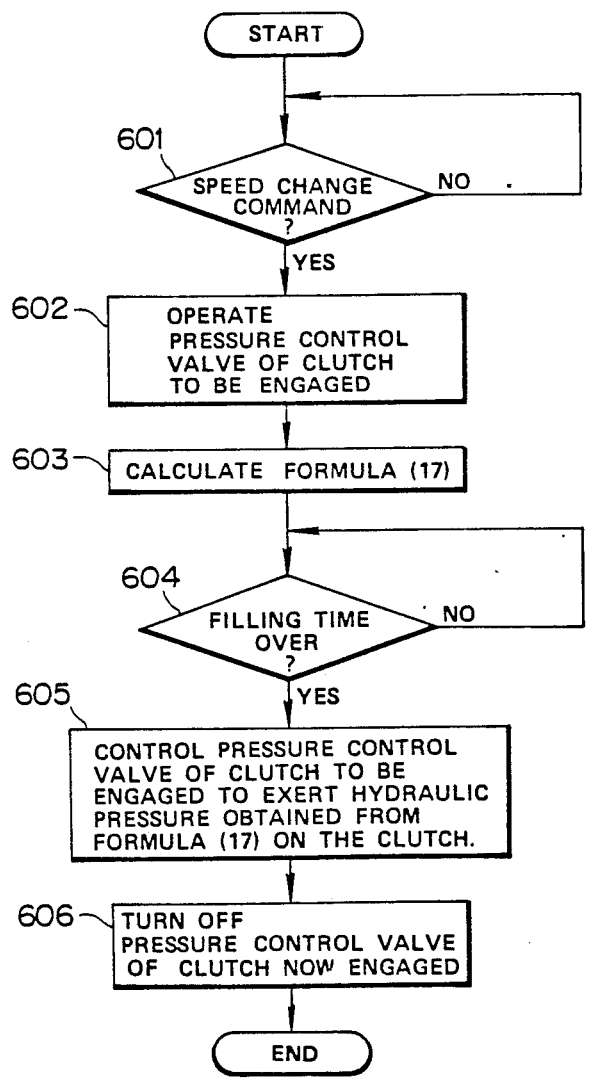
FIG. 23 is a flow chart illustrating a method of controlling speed change clutches in accordance with another embodiment of the present invention.

FIG. 23 illustrates by way of block diagram another embodiment of the invention which is intended to inhibit an occurrence of speed change shock in accordance with the observation made in that way. It should be noted that description will be made below as to this embodiment also on the assumption that the speed change clutch which is now brought in the engaged state serves as speed change clutch 41 for first speed and the next speed change clutch to be engaged serves as speed change clutch 42 for second speed.

In this embodiment the same procedure shown relative to the steps 501 and 502 is executed in steps 601 and 602 and thereafter clutch hydraulic pressure to be applied to the speed change clutch 42 is calculated in the clutch control section 107 in accordance with Formula (17) (step 603).

During the next step 604 judgment is made as to termination of filling time of the speed change clutch 42 for second speed. Once termination of filling time is confirmed during the step 604, clutch hydraulic oil obtained during the step 603 is caused to act on the clutch 42 and thereafter control signal transmitted from the controller 1' is applied to the pressure control valve 22 so as to gradually increase clutch hydraulic pressure (step 605). At the same time the pressure control valve 21 relative to the speed change clutch 41 for first speed is turned off (step 606).

Figure 24:
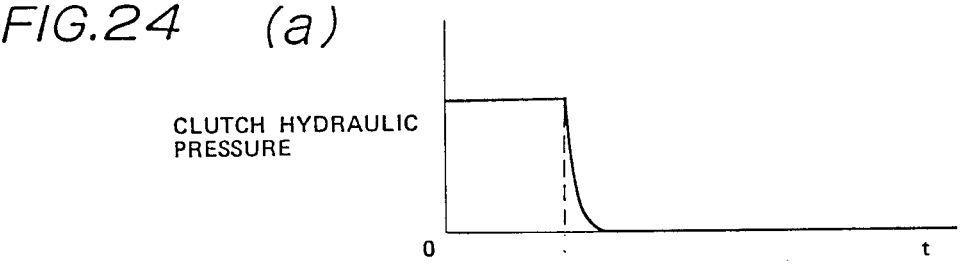
FIGS. 24a–c are graphs illustrating with reference to the flow chart in FIG. 23 how hydraulic pressure of a speed change clutch varies and output torque from the transmission varies.
Figure 24:
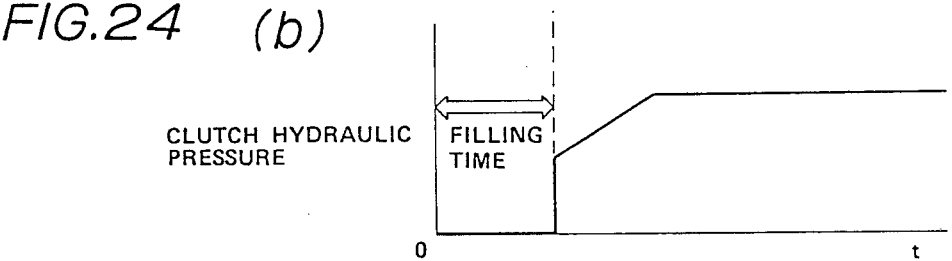
Figure 24:
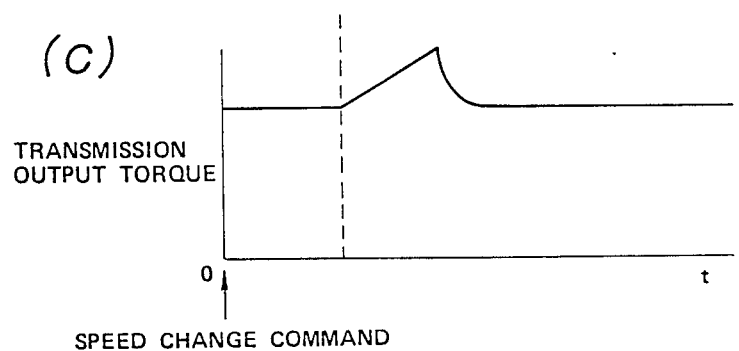

As a result, clutch hydraulic pressure obtained at the time point of termination of filling time during the step 603 is caused to act on the speed change clutch 42 for second speed to be engaged and thereafter it is increased gradually, as shown in FIG. 24(b). Further, hydraulic pressure in the speed change clutch 41 for first step is reduced to a level of zero at the time point of termination of filling time, as shown in FIG. 24(a).

According to this embodiment output shaft torque of the transmission 4' just before speed change is equalized to that at the starting time of speed change whereby an occurrence of speed change shock can be prevented effectively. It should of course be understood that this embodiment has a characterizing feature that such a malfunction that torque transmitted from the transmission 4' is reduced to a level zero due to the existent of filling time can be avoided.

Incidentally, FIG. 24(c) exemplifies output torque characteristic of the transmission 4' in accordance with this embodiment.

According to the above-mentioned embodiment clutch hydraulic pressure in the speed change clutch 41 for first speed is transitionally decreased after the pressure control valve 22 is turned off. In practice, it is not decreased to a level of zero within a very short period of time but it is decreased transitionally as shown in FIG. 24(a). Accordingly, there is a fear that there is produced in dependence on the manner of speed change such a state that the clutch 42 for second speed starts to be brought in the engaged state before the clutch 41 for first speed is released from the engaged state, resulting in an appreciable extent of torque change being caused. In order to prevent an occurrence of phenomenon as mentioned above it is recommendable that hydraulic pressure exerted on the clutch 41 for first speed is caused to change within a period of time as measured from the time point when a speed change command is outputted to the time point when the clutch 42 for second speed starts to be brought in the engaged state and thereby output shaft torque of the transmission 4' generated by operation of the clutch 42 is properly coordinated with output shaft torque of the transmission 4' at the starting time of engagement of the clutch 42 for second speed.

Incidentally, hydraulic pressure P' in the clutch 41 for first speed operable for the purpose of coordination as mentioned above can be obtained in accordance with Formulas (14) and (16).

Figure 25:
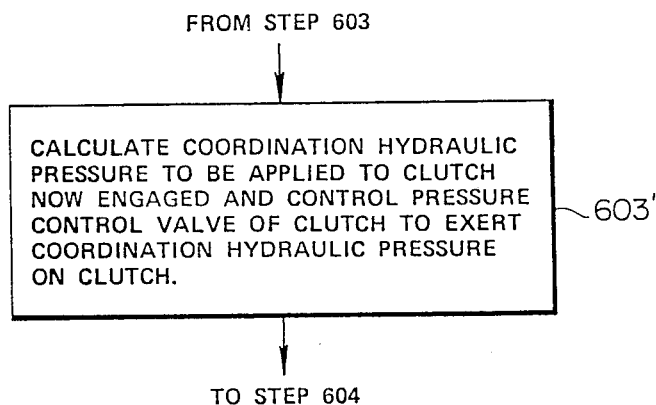
FIG. 25 is a fragmental flow chart illustrating a method of controlling speed change clutches in accordance with further another embodiment of the present invention.
Figure 26:
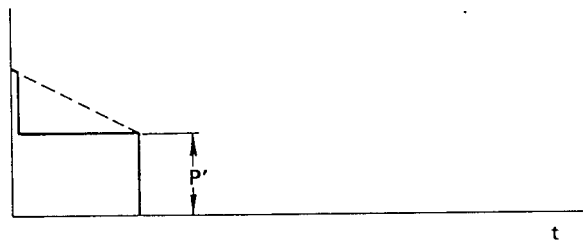
Figure 26:
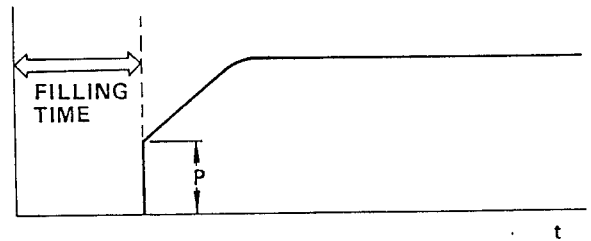
Figure 27:
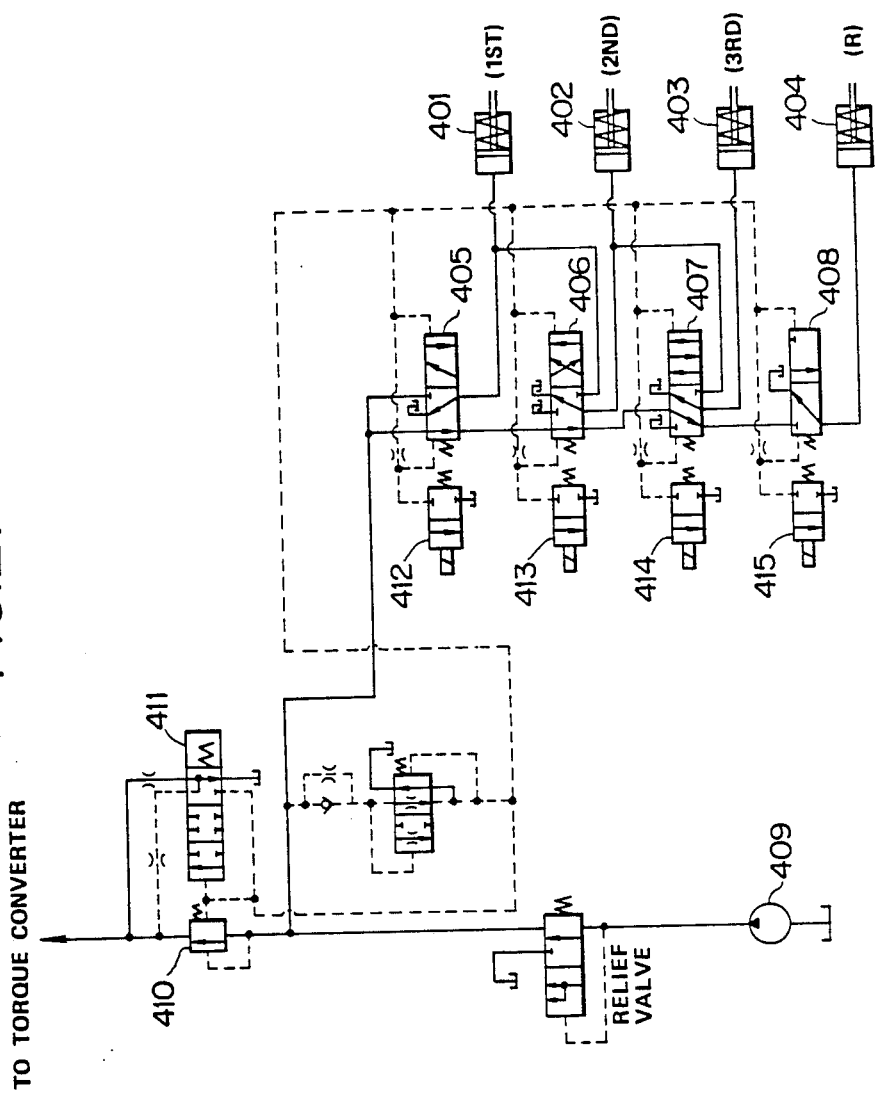
FIG. 27 is a view exemplifying the structure of a conventional speed change apparatus.

FIG. 25 illustrates by way of block diagram another embodiment of the invention which is intended to process the activity of coordination. According to this embodiment processing shown by a step 603' is executed between both the steps 603 and 604 shown in FIG. 23. Namely, processing for calculating clutch hydraulic pressure P' for the purpose of coordination now brought in the engaged state and then controlling the pressure control valve 21 so as to allow hydraulic pressure in the clutch 41 to reach thus calculated hydraulic pressure is executed.

In this case the following two types of manners for changing hydraulic pressure in the clutch 41 with the aid of the pressure control valve 21 are thinkable. One of them is such that clutch hydraulic pressure is changed toward coordination hydraulic pressure P' immediately after a speed change command is issued, as shown in FIG. 28(a). The other one is such that clutch hydraulic pressure is gradually changed until coordination hydraulic pressure P' is reached after a speed change command is issued, as shown by a dotted line in the drawing. It should of course be understood that coordination hydraulic pressure P' in the clutch 41 is not always equalized to hydraulic pressure P at the starting time of engagement relative to the clutch 42.

In the embodiments as shown in FIGS. 23 and 25 output torque before speed change of the transmission 4' is calculated based on output torque ($T_t$) from the torque convertor 3. However, in the case where both the input and output shafts of the torque convertor 3 is lacked up by means of the lock-up clutch 7 before speed change is carried out (see FIG. 16) or in the case where the torque convertor 3 is not in use, the method of calculation as described above cannot be employed. However, even in the above-mentioned case controlling can be effected in the same manner as mentioned above by employing a method of obtaining output torque of the transmission 4' from engine output torque with reference to previously known output characteristics of the engine 2 or a method of directly obtaining output torque of the transmission 4' by means of the torque sensor.

Further, the pressure control valves 21 to 24 in the above-mentioned embodiment may be replaced with a control valve as shown in FIG. 4.

In this embodiment weight of vehicle is obtained by way of the steps of detecting load weight with the use of the loaded weight sensor 15 and then adding weight of the body of vehicle to thus detected weight. However, the present invention should not be limited only to this. Alternatively, weight of vehicle may be obtained in accordance with the following method.

Specifically, driving torque $T_D$ active on the driving wheel shaft of a vehicle can be represented by the following formula.

$$T_D = T_E + T_F \tag{18}$$

where
$T_E$; acceleration torque
$T_F$; load torque

Further, acceleration torque $T_E$ and load torque $T_F$ in Formula (18) can be represented by the following formulas respectively.

$$T_E = \alpha_1 \cdot \left( \frac{R \cdot W}{g} + \frac{I_m \cdot K_1^2}{R} \right) \tag{19}$$

$$T_F = R \cdot W \cdot \mu_R + R \cdot W \cdot \sin\theta + SV^2 \tag{20}$$

where
$\alpha_1$; acceleration of the body of vehicle
$W$; weight of vehicle
$R$; radius of driving wheel
$\mu_R$; rolling resistance
$\theta$; inclination angle of road surface
$SV^2$; air resistance
$I_m$; inertia mass of rotation system on the input side Now, a relation as represented by the following formula can be obtained.

$$W = \frac{g}{\alpha_1 \cdot R} \cdot T_D - \frac{g \cdot I_m \cdot K_1^2}{R^2} + \frac{g}{\alpha_1 \cdot R} \cdot T_F \tag{21}$$

$$= A \cdot \frac{T_D}{\alpha_1} - B + A \cdot \frac{T_F}{\alpha_1}$$

where $$A = \frac{g}{R}$$

$$B = \frac{g \cdot I_m \cdot K_1^2}{R^2}$$

This formula shows that vehicle weight $W$ can be obtained by measuring driving wheel torque $T_D$, vehicle body acceleration $\alpha_1$ and load torque $T_F$.

Driving torque $T_D$ in Formula (21) can be calculated with reference to the relation between throttling amount and engine revolution number and vehicle body acceleration $\alpha_1$ can be measured with the use of an acceleration meter or with reference to variation of engine revolution number. However, it is not easy to calculate load torque $T_F$ in accordance with formula (20). This is because of the fact that it is practically difficult to individually measure $\mu_R$, O and $SV^2$.

However, it is possible to obtain vehicle weight $W$ without any necessity for measurement of load torque $T_F$ by employing a technical idea as mentioned below. Namely, when it is assumed that vehicle body acceleration is identified by $\alpha_2$ during such a state that driving force of the engine is not transmitted to driving wheels (for instance, during such a state that a vehicle is running under the effect of inertia while the transmission 4' is kept in the neutral state), a relation as represented by the following formula is established.

$$T_F = \frac{\alpha_2}{g} \cdot R \cdot W \tag{22}$$

$$= \frac{\alpha_2}{A} \cdot W$$

By introducing $T_F$ in Formula (22) into Formula (21) the following formula can be obtained.

$$W = A \cdot \frac{T_D}{\alpha_1} - B + \frac{A}{\alpha_1} \cdot \left( -\frac{\alpha_2}{A} \right) \cdot W$$

By using the above formula a relation as represented by the following formula is established.

$$W = \frac{A \cdot T_D - B \cdot \alpha_1}{\alpha_1 + \alpha_2} \tag{23}$$

Formula (23) shows that vehicle weight can be calculated from vehicle body acceleration $\alpha_1$ in the case where power generated by the engine is transmitted to driving wheels, vehicle body acceleration $\alpha_2$ in the case where it is not transmitted thereto and driving torque $T_D$.

Figure 28:
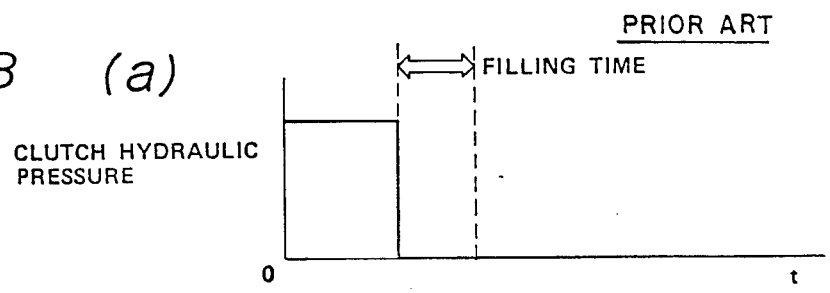
FIGS. 28a–c are graphs illustrating with reference to the speed change apparatus in FIG. 27 how hydraulic pressure of a speed change clutch varies and how output torque from the transmission varies.
Figure 28:
Figure 28:
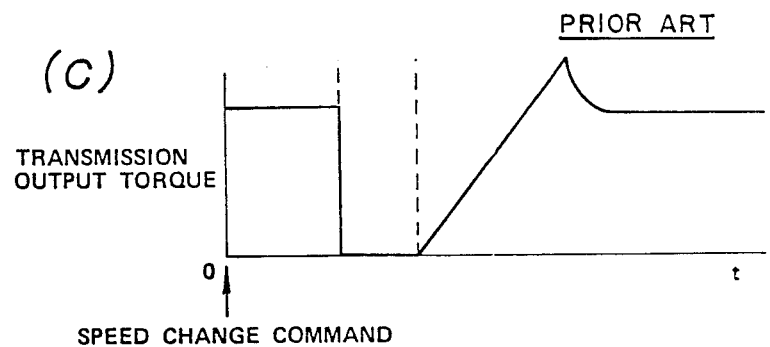

In the case where vehicle weight $W$ is detected in accordance with Formula (23), both accelerations $\alpha_1$ and $\alpha_2$ can be measured by means of an acceleration meter or by differentiating input shaft revolution number of the speed change apparatus with reference to time. In this case it is preferable that acceleration $\alpha_1$ during driving is measured while a vehicle is running at a low speed and acceleration $\alpha_2$ during running under the effect of inertia is measured under the operative condition that power generated by the engine is not transmitted to driving wheels, for instance, during the period of filling time as shown in FIG. 28.

Incidentally, loaded weight can be obtained by subtracting vehicle body weight from the previously known vehicle weight.

Possibility of Utilization of the Invention in Industries

According to the present invention it is assured that clutch hydraulic pressure is so controlled that jerk value assumes a certain target value. Accordingly, the present invention has advantageous effects that speed change shock can be always reduced to an adequate extent by properly setting jerk value to a level of the above-mentioned target value and moreover undesirable heating due to excessive slippage of the clutch can be prevented.

Further, according to the present invention it is assured that filling time which leads to time loss at the time of speed change is substantially reduced to a level of zero and thereby the clutch is brought in the engaged state more quickly. In addition, such a malfunction that torque transmitted from the transmission is decreased to a level of zero at the time of speed change can be avoided.

Furthermore, according to the present invention it is assured that speed change shock is reduced remarkably, since clutch hydraulic pressure is so controlled that output torque from the transmission at the time point when a speed change command is issued is equalized to output torque from the same at the starting time of speed change and moreover clutch hydraulic pressure is so controlled that output torque from the transmission just before speed change is properly coordinated with output torque from the same at the starting time of speed change.

By virtue of the advantageous effects of the present invention as mentioned above, the latter, is advantageously applicable to construction machines, particularly such as large sized dump truck or the like.

We claim:

1. A method of controlling a plurality of speed change clutches which are to be incorporated in a transmission of a vehicle, said method being adapted to be applied to said transmission, characterized in that said speed change clutches are controlled by the following steps:
   (a) establishing a target value of jerk value;
   (b) predetermining, for each speed change stage, a relation among a clutch hydraulic pressure to be applied to one of said plurality of speed change clutches to be brought into the engaged state when an intended speed stage is selected, a clutch disc relative revolution number of said one of the speed change clutches and an amount of throttling for causing said jerk value to be said target value;
   (c) sensing vehicle weight and determining an increase gradient of a clutch hydraulic pressure to be applied to said one of the speed change clutches in accordance with said vehicle weight and a speed stage to be selected such that jerk value becomes said target value;
   (d) causing said clutch hydraulic pressure applied to said one of the speed change clutches to be brought into the engaged state to gradually increase in accordance with said increase gradient;
   (e) sensing said clutch hydraulic pressure, said disc relative revolution number and said amount of throttling, and maintaining said clutch hydraulic pressure at a value as measured at a first time point when said clutch hydraulic pressure, said disc relative revolution number and said amount of throttling establish said predetermined value; and
   (f) causing said clutch hydraulic pressure to increase to a level of specified pressure at a second time point when said disc relative revolution number is decreased to a level of zero.

2. A method of controlling a plurality of speed change clutches which are incorporated in a transmission as claimed in claim 1, characterized by effecting said clutch hydraulic pressure gradual increase with the use of a hydraulic oil feeding device of which can determine hydraulic pressure increase gradient electrically.

3. A method of controlling a plurality of speed change clutches which are incorporated in a transmission as claimed in claim 1, characterized by the step of calculating said vehicle weight W in accordance with the following formula:

$$W = g/R \cdot T_D - (g \cdot I_m \cdot K\alpha/R^2) \cdot 1/(\alpha_1 + \alpha_2)$$

where
g = acceleration of gravity
R = radius of driving wheels
$T_D$ = driving torque exerted on driving wheel shaft
$I_m$ = inertia mass of rotation system on the input side
$K_1$ = total speed change ratio
$\alpha_1$ = acceleration of vehicle body
$\alpha_2$ = acceleration of vehicle body under the operative state that driving force generated by engine is not transmitted by driving wheels.

4. A method of controlling a plurality of speed change clutches which are to be incorporated in a transmission of a vehicle, said method being adapted to be applied to said transmission, characterized in that said speed change clutches are controlled by the following steps:
   (a) at a time point when a speed change command is issued, feeding one of said plurality of speed change clutches to be subsequently brought into the engaged state with hydraulic oil;
   (b) at the time point when said speed change command is issued, calculating both output torque from said transmission just before speed change and output torque from said transmission immediately after speed change, respectively;
   (c) calculating a clutch hydraulic pressure to equalize said output torques;
   (d) sensing the termination of filling time with respect to said one of speed change clutches to be subsequently brought into the engaged state; and
   (e) causing said hydraulic pressure to decrease in the speed change clutch which is presently brought in the engaged state while exerting said calculating clutch hydraulic pressure on said one of speed change clutch to be subsequently brought into engaged state and thereafter causing said clutch hydraulic pressure to increase gradually on said speed change clutch.

5. A method of controlling a plurality of speed change clutches which are to be incorporated in a transmission of a vehicle, said method being adapted to be applied to said transmission, characterized in that said speed change clutches are controlled by the following steps:
   (a) at a time point when a speed change command is issued, applying hydraulic oil to one of said plurality of speed change clutches to be subsequently brought into the engaged state;
   (b) at the time point when said speed change command is issued, calculating both output torque from said transmission just before speed change and output torque from said transmission immediately after speed change, respectively;
   (c) calculating both a first clutch hydraulic pressure with respect to a speed change clutch which is presently brought in the engaged state and a second clutch hydraulic pressure with respect to one of said speed change clutches to be subsequently brought into the engaged state, respectively;
   (d) changing said hydraulic pressure in said speed change clutch which is presently brought in the engaged stage to an intensity of said first clutch hydraulic pressure;
   (e) sensing the termination of filling time with respect to one of said speed change clutches to be subsequently brought into the engaged state; and
   (f) causing said first hydraulic pressure to decrease on said speed change clutch which is presently brought in the engaged state while exerting said second clutch hydraulic pressure on one of said speed change clutches to be subsequently brought into the engaged state and thereafter causing said second clutch hydraulic pressure to increase gradually on one of said speed change clutches to be subsequently brought into the engaged state.

6. A method of controlling a plurality of speed change clutches which are incorporated in a transmission as claimed in claims 1 or 5, characterized by controlling said hydraulic pressure exerted on each of said speed change clutches by means of an electronically controlled type pressure control valve which is hydraulically connected individually to each of said speed change clutches.

7. A method of controlling a plurality of speed change clutches which are incorporated in a transmission as claimed in claims 4 or 5, characterized by calculating output torque $T_B$ from the transmission as measured at the time point when said speed change command is issued in accordance with the following formula:

$$T_B = G \cdot T_t$$

where
   $G$ = gear ratio of the whole transmission
   $T_t$ = output torque from the torque converter.

8. A method of controlling a plurality of speed change clutches which are incorporated in a transmission as claimed in claims 4 or 5, characterized by calculating output torque $T_D$ from the transmission as measured at the starting time of speed change in accordance with the following formula:

$$T_A = G' \cdot T_c$$

where
   $G'$ = gear ratio between clutch to be engaged and transmission output shaft at the starting time of speed change
   $T_c$ = friction torque of clutch to be engaged at the starting time of speed change.

\* \* \* \* \*